(12) United States Patent
You et al.

(10) Patent No.: US 12,555,393 B2
(45) Date of Patent: Feb. 17, 2026

(54) VEHICLE DATA FUSION BASED ON SPATIOTEMPORAL INFORMATION AND SUBGRAPH SIMILARITY

(71) Applicant: International Business Machines Corporation, Armonk, NY (US)

(72) Inventors: Yu Zui You, Ningbo (CN); Teng Sun, Beijing (CN); Yi Ming Wang, Xi'an (CN); Hai Bo Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 18/353,392

(22) Filed: Jul. 17, 2023

(65) Prior Publication Data

US 2025/0029405 A1      Jan. 23, 2025

(51) Int. Cl.
*G06V 20/62* (2022.01)
*G06Q 50/26* (2012.01)
(Continued)

(52) U.S. Cl.
CPC .......... *G06V 20/625* (2022.01); *G06Q 50/26* (2013.01); *G06V 10/761* (2022.01); *G06V 10/82* (2022.01); *G06V 20/54* (2022.01)

(58) Field of Classification Search
CPC .... G06V 20/625; G06V 10/761; G06V 10/82; G06V 20/54; G06Q 50/26
See application file for complete search history.

(56) References Cited

U.S. PATENT DOCUMENTS 7,108,178 B1 *   9/2006   Choi ....................... B60R 25/00
                                                                701/1
9,286,793 B2 *   3/2016   Pan ....................... G08G 1/0112
(Continued)

FOREIGN PATENT DOCUMENTS

CN         1613069 A        5/2005
CN       105593863 A        5/2016
(Continued)

OTHER PUBLICATIONS

"Wuhan (The recognition methods of a kind of deck suspicion license plate number and system)" (Year: 2016).*

*Primary Examiner* — Solomon G Bezuayehu
(74) *Attorney, Agent, or Firm* — Yee & Associates, P.C.

(57) ABSTRACT

Vehicle license plate auditing is provided. Distance and time traveling information corresponding to a vehicle is extracted from a data network analysis graph model of spatiotemporal traffic flow data based on a license plate number of the vehicle in response to removing irrelevant nodes from the data network analysis graph model. A distance and time mutually exclusive node relationship is determined within the data network analysis graph model of spatiotemporal traffic flow data based on the distance and time traveling information corresponding to the vehicle extracted from the data network analysis graph model of spatiotemporal traffic flow data. An anomalous license plate node is determined in the data network analysis graph model of spatiotemporal traffic flow data based on the distance and time mutually exclusive node relationship. A set of action steps is performed regarding an anomalous license plate number corresponding to the anomalous license plate node.

17 Claims, 14 Drawing Sheets

(51) Int. Cl.
    *G06V 10/74*         (2022.01)
    *G06V 10/82*         (2022.01)
    *G06V 20/54*         (2022.01)

(56)         References Cited

U.S. PATENT DOCUMENTS

| | | | |
|---|---|---|---|
| 9,996,753 | B2 | 6/2018 | Madden et al. |
| 2018/0061143 | A1* | 3/2018 | Nelson .................... G06Q 20/10 |
| 2018/0114390 | A1* | 4/2018 | Dong ................. G07C 9/00896 |
| 2020/0250405 | A1* | 8/2020 | Ming ................. G06V 40/172 |
| 2020/0380864 | A1* | 12/2020 | Yan ........................ G06V 20/40 |
| 2021/0303899 | A1* | 9/2021 | Mains, Jr. ............... H04N 7/188 |

FOREIGN PATENT DOCUMENTS

| | | | | |
|---|---|---|---|---|
| CN | 101057244 | B | | 12/2016 |
| CN | 106251635 | A | * | 12/2016 ........... G08G 1/0175 |
| CN | 107204117 | A | * | 9/2017 ............. G08G 1/017 |
| CN | 111737364 | B | | 12/2020 |
| CN | 112017431 | A | | 12/2020 |
| CN | 113160571 | B | | 7/2021 |
| CN | 111524357 | B | | 1/2022 |
| CN | 108198595 | B | | 5/2022 |
| CN | 115827335 | B | | 5/2023 |
| CN | 116049764 | A | | 5/2023 |
| CN | 116076339 | A | | 5/2023 |
| CN | 116077067 | A | | 5/2023 |

\* cited by examiner

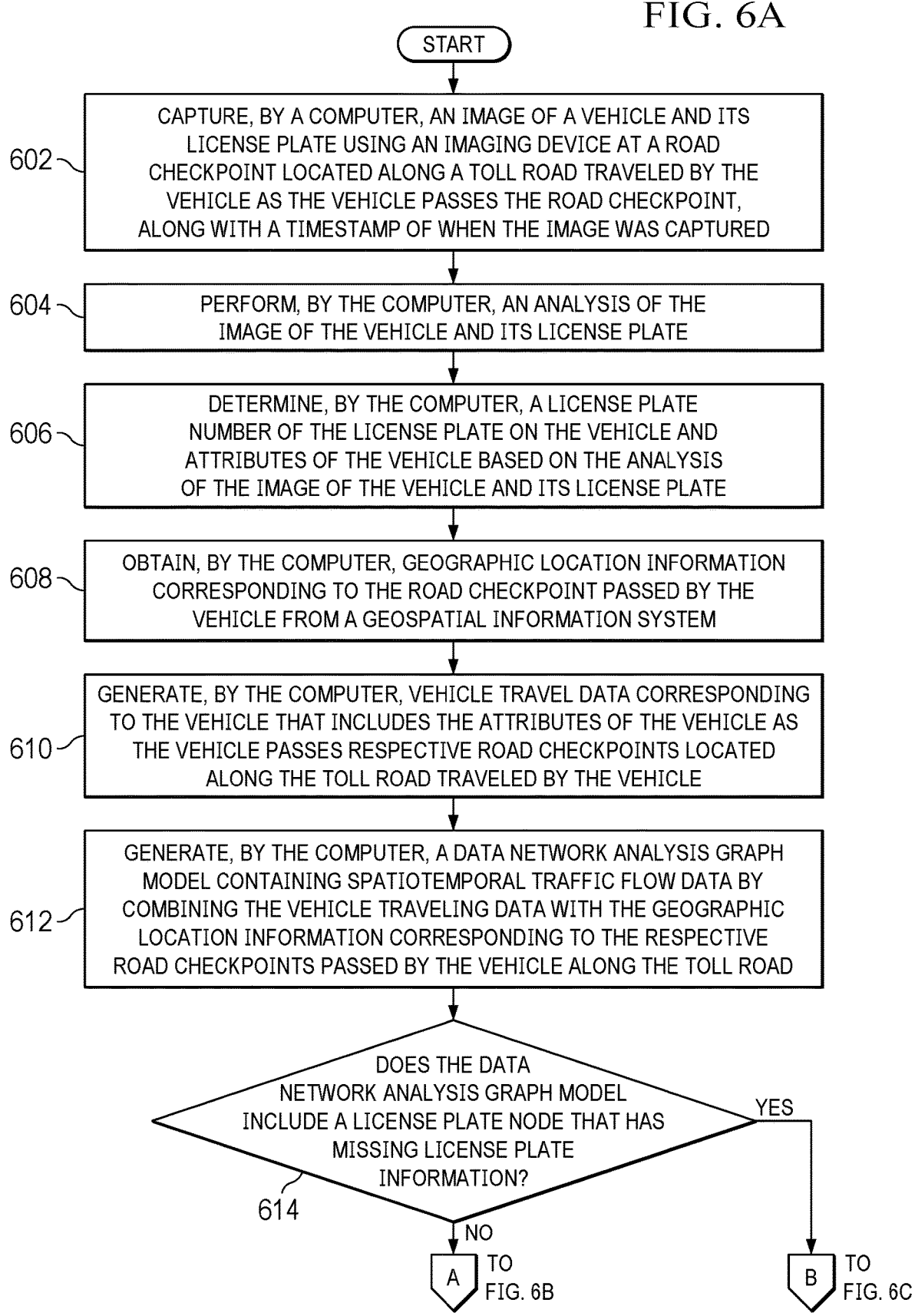

VEHICLE DATA FUSION BASED ON SPATIOTEMPORAL INFORMATION AND SUBGRAPH SIMILARITY

BACKGROUND

The disclosure relates generally to vehicle license plates and more specifically to vehicle license plate auditing.

With the growth of vehicle ownership, vehicle violations of shielding or covering of license plate numbers have become common in order to evade traffic authority scrutiny and various toll road fees. A toll road is a controlled-access roadway for which a fee is assessed for passage. The amount of the fee for a particular toll road varies based on, for example, vehicle type, weight, number of axles, number of passengers, distance traveled, and the like. For example, freight trucks are often charged higher fees than cars on toll roads. Fees are typically assessed at road checkpoints or toll stations that utilize automatic license plate number recognition. Automatic license plate number recognition is a technology that uses optical character recognition on images captured by cameras to read vehicle license plates.

A vehicle with a shielded license plate may, for example, have no insurance coverage, no vehicle registration, be a stolen vehicle, or the like. In addition, when a vehicle with a shielded license plate is involved in a traffic accident, the owner (e.g., driver) of that vehicle is able to avoid identification, which increases the difficulty of assigning responsibility. Further, road management departments cannot collect toll road usage fees from owners of vehicles having shielded license plates, which increases toll fees for others.

SUMMARY

According to one illustrative embodiment, a computer-implemented method for vehicle license plate auditing is provided. A computer extracts distance and time traveling information corresponding to a vehicle from a data network analysis graph model of spatiotemporal traffic flow data based on a license plate number of the vehicle in response to removing irrelevant nodes from the data network analysis graph model. The computer determines a distance and time mutually exclusive node relationship within the data network analysis graph model of spatiotemporal traffic flow data based on the distance and time traveling information corresponding to the vehicle extracted from the data network analysis graph model of spatiotemporal traffic flow data. The computer determines an anomalous license plate node in the data network analysis graph model of spatiotemporal traffic flow data based on the distance and time mutually exclusive node relationship. The computer performs a set of action steps regarding an anomalous license plate number corresponding to the anomalous license plate node. According to other illustrative embodiments, a computer system and computer program product for vehicle license plate auditing are provided.

BRIEF DESCRIPTION OF THE DRAWINGS

FIGS. 6A-6D are a flowchart illustrating a process for vehicle license plate auditing in accordance with an illustrative embodiment.

DETAILED DESCRIPTION

Figure 1:
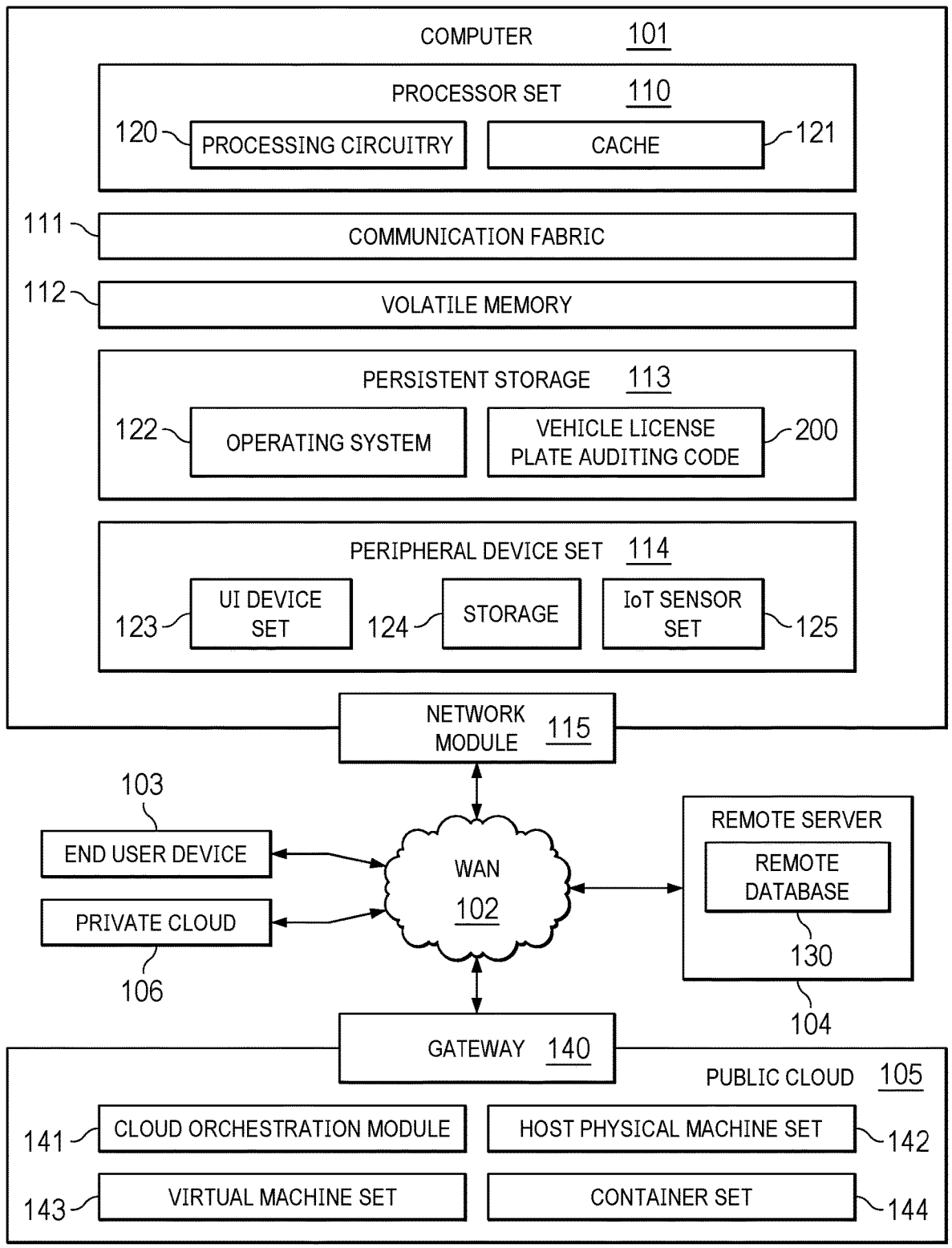
FIG. 1 is a pictorial representation of a computing environment in which illustrative embodiments may be implemented.

A computer-implemented method provides vehicle license plate auditing. A computer extracts distance and time traveling information corresponding to a vehicle from a data network analysis graph model of spatiotemporal traffic flow data based on a license plate number of the vehicle in response to removing irrelevant nodes from the data network analysis graph model. The computer determines a distance and time mutually exclusive node relationship within the data network analysis graph model of spatiotemporal traffic flow data based on the distance and time traveling information corresponding to the vehicle extracted from the data network analysis graph model of spatiotemporal traffic flow data. The computer determines an anomalous license plate node in the data network analysis graph model of spatiotemporal traffic flow data based on the distance and time mutually exclusive node relationship. The computer performs a set of action steps regarding an anomalous license plate number corresponding to the anomalous license plate node. As a result, illustrative embodiments provide a technical effect of automatically auditing vehicle license plates and performing a set of actions in response to detecting an anomalous license plate node exists in the data network analysis graph model of spatiotemporal traffic flow data.

The computer also generates a plurality of subgraphs indicating relationships between license plate nodes within the data network analysis graph model of spatiotemporal traffic flow data in response to the computer determining that the data network analysis graph model includes a license plate node that has missing license plate information. Each respective subgraph of the plurality of subgraphs contains a license plate node, a set of vehicle attribute nodes corresponding to the license plate node, and a road checkpoint node corresponding to the license plate node. The computer, using a similarity algorithm, determines an amount of similarity between each pair of subgraphs within the plurality of subgraphs based on fusion of information corresponding to nodes and edges contained in each particular pair of subgraphs. The computer generates a similarity confidence score for each particular pair of subgraphs based on the amount of similarity between each pair of subgraphs. The computer performs a comparison of the similarity confidence score of each particular pair of subgraphs to a defined similarity confidence score threshold level. As a result, illustrative embodiments provide a technical effect of determining the amount of similarity between subgraphs within the data network analysis graph model of spatiotemporal traffic flow data based on fusion of information.

The computer further determines whether the similarity confidence score between a particular subgraph that contains the license plate node having the missing license plate information and an other subgraph that contains a given license plate node having the license plate number of the vehicle is greater than the similarity confidence score threshold level based on the comparison. The computer determines that the license plate number of the vehicle corresponds to the license plate node having the missing license plate information in response to the computer determining that the similarity confidence score between the particular subgraph that contains the license plate node having the missing license plate information and the other subgraph that contains the given license plate node having the license plate number of the vehicle is greater than the similarity confidence score threshold level based on the comparison. The computer sends a notification to a traffic authority regarding the license plate number of the vehicle corresponding to the missing license plate information to assess a fee to the license plate number of the vehicle for usage of a toll road. As a result, illustrative embodiments provide a technical effect of determining missing license plate information based on similarity confidence scores between subgraphs.

Furthermore, the computer determines that a different license plate number corresponds to the license plate node having the missing license plate information in response to the computer determining that the similarity confidence score between the particular subgraph that contains the license plate node having the missing license plate information and the other subgraph that contains the given license plate node having the license plate number of the vehicle is not greater than the similarity confidence score threshold level based on the comparison. As a result, illustrative embodiments provide a technical effect of determining when a different license plate number corresponds to missing license plate information.

Moreover, the computer captures an image of the vehicle and its license plate using an imaging device at a road checkpoint located along a toll road traveled by the vehicle as the vehicle passes the road checkpoint, along with a timestamp of when the image was captured. The computer performs an analysis of the image of the vehicle and its license plate utilizing at least one of automatic license plate number recognition technology, computer vision, and an image convolutional neural network. The computer determines the license plate number of the license plate on the vehicle and attributes of the vehicle based on the analysis of the image of the vehicle and its license plate. As a result, illustrative embodiments provide a technical effect of determining the license plate number on the vehicle and attributes of the vehicle based on the analysis of the image of the vehicle and its license plate.

In addition, the computer obtains geographic location information corresponding to the road checkpoint passed by the vehicle from a geospatial information system. The computer generates vehicle travel data corresponding to the vehicle that includes the attributes of the vehicle as the vehicle passes respective road checkpoints located along the toll road traveled by the vehicle. As a result, illustrative embodiments provide a technical effect of generating vehicle travel data corresponding to the vehicle that includes the attributes of the vehicle.

The computer also generates the data network analysis graph model containing the spatiotemporal traffic flow data by combining the vehicle traveling data with the geographic location information corresponding to the respective road checkpoints passed by the vehicle along the toll road. The computer determines whether the data network analysis graph model containing the spatiotemporal traffic flow data includes a license plate node that has missing license plate information. The computer removes irrelevant license plate nodes corresponding to license plate numbers that do not match the license plate number of the vehicle, along with vehicle attributes nodes associated with the irrelevant license plate nodes corresponding to the license plate numbers that do not match the license plate number of the vehicle, from the data network analysis graph model in response to the computer determining that the data network analysis graph model does not include a license plate node that has missing license plate information. As a result, illustrative embodiments provide a technical effect of removing irrelevant license plate nodes corresponding to license plate numbers that do not match the license plate number of the vehicle, along with vehicle attributes nodes associated with the irrelevant license plate nodes corresponding to the license plate numbers that do not match the license plate number of the vehicle, from the data network analysis graph model.

A computer system for vehicle license plate auditing comprises a communication fabric, a storage device connected to the communication fabric, where the storage device stores program instructions, and a processor connected to the communication fabric, where the processor executes the program instructions. The computer system extracts distance and time traveling information corresponding to a vehicle from a data network analysis graph model of spatiotemporal traffic flow data based on a license plate number of the vehicle in response to removing irrelevant nodes from the data network analysis graph model. The computer system determines a distance and time mutually exclusive node relationship within the data network analysis graph model of spatiotemporal traffic flow data based on the distance and time traveling information corresponding to the vehicle extracted from the data network analysis graph model of spatiotemporal traffic flow data. The computer system determines an anomalous license plate node in the data network analysis graph model of spatiotemporal traffic flow data based on the distance and time mutually exclusive node relationship. The computer system performs a set of action steps regarding an anomalous license plate number corresponding to the anomalous license plate node. As a result, illustrative embodiments provide a technical effect of automatically auditing vehicle license plates and performing a set of actions in response to detecting an anomalous license plate node exists in the data network analysis graph model of spatiotemporal traffic flow data.

The computer system also generates a plurality of subgraphs indicating relationships between license plate nodes within the data network analysis graph model of spatiotemporal traffic flow data in response to the computer determining that the data network analysis graph model includes a license plate node that has missing license plate information. Each respective subgraph of the plurality of subgraphs contains a license plate node, a set of vehicle attribute nodes corresponding to the license plate node, and a road checkpoint node corresponding to the license plate node. The computer system, using a similarity algorithm, determines an amount of similarity between each pair of subgraphs within the plurality of subgraphs based on fusion of information corresponding to nodes and edges contained in each particular pair of subgraphs. The computer system generates a similarity confidence score for each particular pair of subgraphs based on the amount of similarity between each pair of subgraphs. The computer system performs a comparison of the similarity confidence score of each particular pair of subgraphs to a defined similarity confidence score threshold level. As a result, illustrative embodiments provide a technical effect of determining the amount of similarity between subgraphs within the data network analysis graph model of spatiotemporal traffic flow data based on fusion of information.

The computer system further determines whether the similarity confidence score between a particular subgraph that contains the license plate node having the missing license plate information and an other subgraph that contains a given license plate node having the license plate number of the vehicle is greater than the similarity confidence score threshold level based on the comparison. The computer system determines that the license plate number of the vehicle corresponds to the license plate node having the missing license plate information in response to the computer system determining that the similarity confidence score between the particular subgraph that contains the license plate node having the missing license plate information and the other subgraph that contains the given license plate node having the license plate number of the vehicle is greater than the similarity confidence score threshold level based on the comparison. The computer system sends a notification to a traffic authority regarding the license plate number of the vehicle corresponding to the missing license plate information to assess a fee to the license plate number of the vehicle for usage of a toll road. As a result, illustrative embodiments provide a technical effect of determining missing license plate information based on similarity confidence scores between subgraphs.

Furthermore, the computer system determines that a different license plate number corresponds to the license plate node having the missing license plate information in response to the computer system determining that the similarity confidence score between the particular subgraph that contains the license plate node having the missing license plate information and the other subgraph that contains the given license plate node having the license plate number of the vehicle is not greater than the similarity confidence score threshold level based on the comparison. As a result, illustrative embodiments provide a technical effect of determining when a different license plate number corresponds to missing license plate information.

Moreover, the computer system captures an image of the vehicle and its license plate using an imaging device at a road checkpoint located along a toll road traveled by the vehicle as the vehicle passes the road checkpoint, along with a timestamp of when the image was captured. The computer system performs an analysis of the image of the vehicle and its license plate utilizing at least one of automatic license plate number recognition technology, computer vision, and an image convolutional neural network. The computer system determines the license plate number of the license plate on the vehicle and attributes of the vehicle based on the analysis of the image of the vehicle and its license plate. As a result, illustrative embodiments provide a technical effect of determining the license plate number on the vehicle and attributes of the vehicle based on the analysis of the image of the vehicle and its license plate.

In addition, the computer system obtains geographic location information corresponding to the road checkpoint passed by the vehicle from a geospatial information system. The computer system generates vehicle travel data corresponding to the vehicle that includes the attributes of the vehicle as the vehicle passes respective road checkpoints located along the toll road traveled by the vehicle. As a result, illustrative embodiments provide a technical effect of generating vehicle travel data corresponding to the vehicle that includes the attributes of the vehicle.

A computer program product for vehicle license plate auditing comprises a computer-readable storage medium having program instructions embodied therewith, the program instructions executable by a computer. The computer extracts distance and time traveling information corresponding to a vehicle from a data network analysis graph model of spatiotemporal traffic flow data based on a license plate number of the vehicle in response to removing irrelevant nodes from the data network analysis graph model. The computer determines a distance and time mutually exclusive node relationship within the data network analysis graph model of spatiotemporal traffic flow data based on the distance and time traveling information corresponding to the vehicle extracted from the data network analysis graph model of spatiotemporal traffic flow data. The computer determines an anomalous license plate node in the data network analysis graph model of spatiotemporal traffic flow data based on the distance and time mutually exclusive node relationship. The computer performs a set of action steps regarding an anomalous license plate number corresponding to the anomalous license plate node. As a result, illustrative embodiments provide a technical effect of automatically auditing vehicle license plates and performing a set of actions in response to detecting an anomalous license plate node exists in the data network analysis graph model of spatiotemporal traffic flow data.

The computer also generates a plurality of subgraphs indicating relationships between license plate nodes within the data network analysis graph model of spatiotemporal traffic flow data in response to the computer determining that the data network analysis graph model includes a license plate node that has missing license plate information. Each respective subgraph of the plurality of subgraphs contains a license plate node, a set of vehicle attribute nodes corresponding to the license plate node, and a road checkpoint node corresponding to the license plate node. The computer, using a similarity algorithm, determines an amount of similarity between each pair of subgraphs within the plurality of subgraphs based on fusion of information corresponding to nodes and edges contained in each particular pair of subgraphs. The computer generates a similarity confidence score for each particular pair of subgraphs based on the amount of similarity between each pair of subgraphs. The computer performs a comparison of the similarity confidence score of each particular pair of subgraphs to a defined similarity confidence score threshold level. As a result, illustrative embodiments provide a technical effect of determining the amount of similarity between subgraphs within the data network analysis graph model of spatiotemporal traffic flow data based on fusion of information.

The computer further determines whether the similarity confidence score between a particular subgraph that contains the license plate node having the missing license plate information and an other subgraph that contains a given license plate node having the license plate number of the vehicle is greater than the similarity confidence score threshold level based on the comparison. The computer determines that the license plate number of the vehicle corresponds to the license plate node having the missing license plate information in response to the computer determining that the similarity confidence score between the particular subgraph that contains the license plate node having the missing license plate information and the other subgraph that contains the given license plate node having the license plate number of the vehicle is greater than the similarity confidence score threshold level based on the comparison. The computer sends a notification to a traffic authority regarding the license plate number of the vehicle corresponding to the missing license plate information to assess a fee to the license plate number of the vehicle for usage of a toll road. As a result, illustrative embodiments provide a technical effect of determining missing license plate information based on similarity confidence scores between subgraphs.

Furthermore, the computer determines that a different license plate number corresponds to the license plate node having the missing license plate information in response to the computer determining that the similarity confidence score between the particular subgraph that contains the license plate node having the missing license plate information and the other subgraph that contains the given license plate node having the license plate number of the vehicle is not greater than the similarity confidence score threshold level based on the comparison. As a result, illustrative embodiments provide a technical effect of determining when a different license plate number corresponds to missing license plate information.

Moreover, the computer captures an image of the vehicle and its license plate using an imaging device at a road checkpoint located along a toll road traveled by the vehicle as the vehicle passes the road checkpoint, along with a timestamp of when the image was captured. The computer performs an analysis of the image of the vehicle and its license plate utilizing at least one of automatic license plate number recognition technology, computer vision, and an image convolutional neural network. The computer determines the license plate number of the license plate on the vehicle and attributes of the vehicle based on the analysis of the image of the vehicle and its license plate. As a result, illustrative embodiments provide a technical effect of determining the license plate number on the vehicle and attributes of the vehicle based on the analysis of the image of the vehicle and its license plate.

In addition, the computer obtains geographic location information corresponding to the road checkpoint passed by the vehicle from a geospatial information system. The computer generates vehicle travel data corresponding to the vehicle that includes the attributes of the vehicle as the vehicle passes respective road checkpoints located along the toll road traveled by the vehicle. As a result, illustrative embodiments provide a technical effect of generating vehicle travel data corresponding to the vehicle that includes the attributes of the vehicle.

The computer also generates the data network analysis graph model containing the spatiotemporal traffic flow data by combining the vehicle traveling data with the geographic location information corresponding to the respective road checkpoints passed by the vehicle along the toll road. The computer determines whether the data network analysis graph model containing the spatiotemporal traffic flow data includes a license plate node that has missing license plate information. The computer removes irrelevant license plate nodes corresponding to license plate numbers that do not match the license plate number of the vehicle, along with vehicle attributes nodes associated with the irrelevant license plate nodes corresponding to the license plate numbers that do not match the license plate number of the vehicle, from the data network analysis graph model in response to the computer determining that the data network analysis graph model does not include a license plate node that has missing license plate information. As a result, illustrative embodiments provide a technical effect of removing irrelevant license plate nodes corresponding to license plate numbers that do not match the license plate number of the vehicle, along with vehicle attributes nodes associated with the irrelevant license plate nodes corresponding to the license plate numbers that do not match the license plate number of the vehicle, from the data network analysis graph model.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
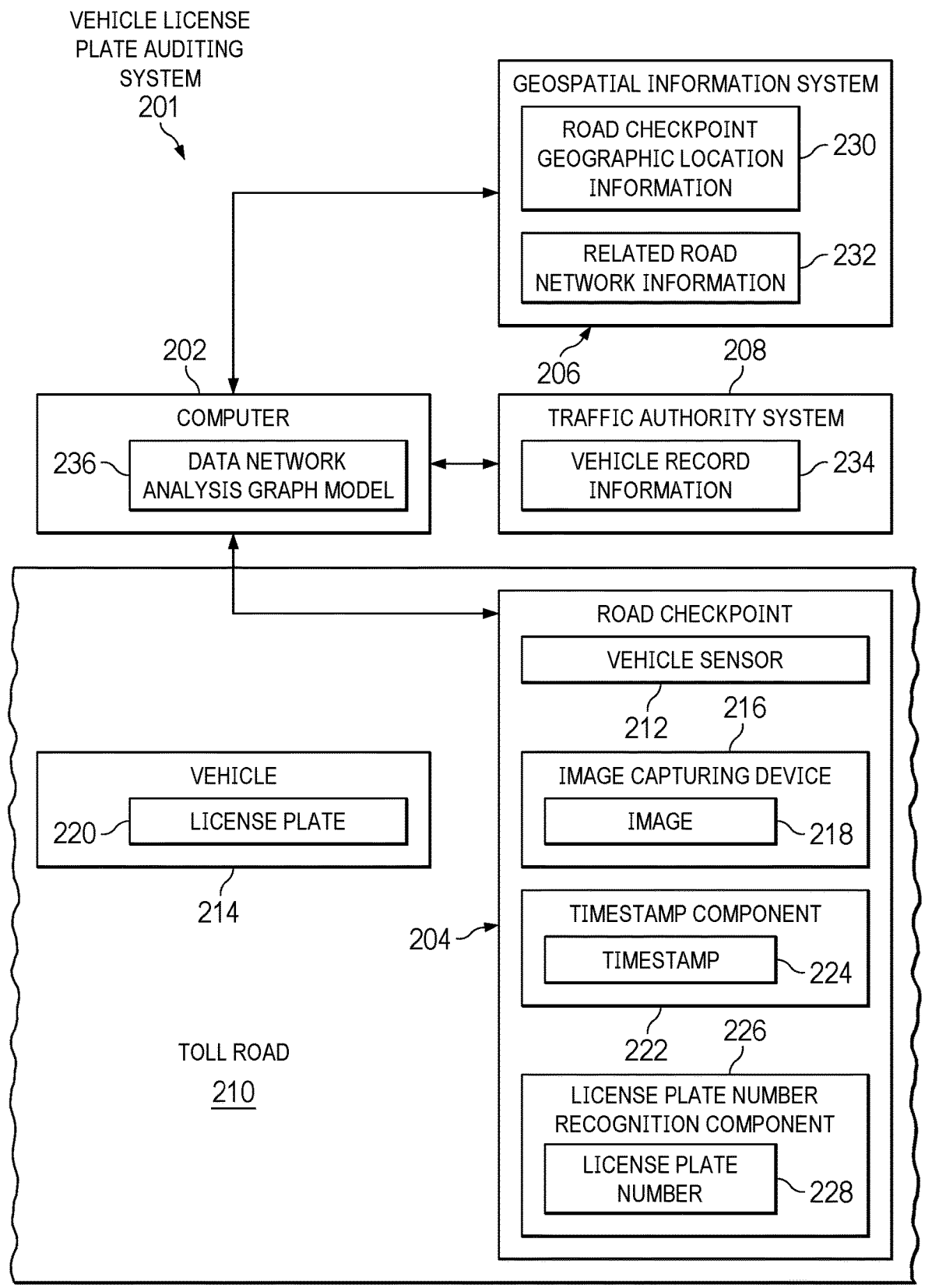
FIG. 2 is a diagram illustrating an example of a vehicle license plate auditing system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as vehicle license plate auditing code 200. For example, vehicle license plate auditing code 200 performs license plate anomaly detection using vehicle data fusion. Vehicle license plate auditing code 200 detects when vehicle license plate information is incorrect or not credible (e.g., fabricated or stolen license plates used to shield legitimate license plates) utilizing spatiotemporal conflict checking. Vehicle license plate auditing code 200 also utilizes subgraph similarity analysis to fuse data to determine missing license plate information (e.g., missing numbers of partially obscured license plates).

In addition to vehicle license plate auditing code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and vehicle license plate auditing code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, mainframe computer, quantum computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored vehicle license plate auditing code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The vehicle license plate auditing code included in block 200 includes at least some of the computer code involved in performing the inventive methods of illustrative embodiments.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a user corresponding to a traffic authority utilizing the vehicle license plate auditing services provided by computer 101), and may take any of the forms discussed above in connection with computer 101. EUD 103 typically receives helpful and useful data from the operations of computer 101. For example, in a hypothetical case where computer 101 is designed to provide a notification to the end user, this notification would typically be communicated from network module 115 of computer 101 through WAN 102 to EUD 103. In this way, EUD 103 can display, or otherwise present, the notification to the end user. In some embodiments, EUD 103 may be a client device, such as thin client, heavy client, mainframe computer, desktop computer, laptop computer, tablet computer, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a notification based on historical vehicle travel data, then this historical vehicle travel data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category. For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

When vehicles have shielded plate numbers, it is difficult for traffic authorities to, for example, analyze and integrate vehicle travel data, assess appropriate toll road fees, find potential anomalous patterns in massive amounts of traffic flow data, conduct rapid vehicle positioning analysis, and the like. It should be noted that as used herein, a vehicle license plate number includes at least one of numbers, letters, special characters, symbols, graphics, images, emojis, and the like. To audit vehicles with shielded license plates, current solutions rely on a comparative analysis with a license plate information database. When a license plate shield is a discarded license plate, fabricated license plate, stolen license plate, or the like, current solutions trigger an alarm message based on the comparative analysis with the license plate information database. However, if it is a shielded license plate, then it is not possible for current solutions to identify the violating vehicle and the vehicle owner. In the case of shielded or obscured vehicle license plates, traffic authorities are mainly relied upon for the identification of these vehicles during times of patrolling toll roads. However, during times of non-road patrolling by traffic authorities, vehicles having shielded or obscured license plates are able to avoid toll road usage fees. Furthermore, even if a shielded or obscured license plate is captured via a camera image at a road checkpoint or toll station, it is impossible for current solutions to identify the correct license plate information of the suspected vehicle.

Illustrative embodiments perform data fusion of vehicle data (e.g., both structured vehicle data and unstructured vehicle data) based on spatiotemporal (i.e., distance and time) information and subgraph similarities between the vehicle data. Illustrative embodiments collect the spatiotemporal information at different times (i.e., different timestamps) related to different events (i.e., vehicles passing road checkpoints or toll stations).

For example, illustrative embodiments capture an image of a vehicle and its license plate, along with a timestamp of when the image was captured, as the vehicle passes a road checkpoint located along a toll road traveled by the vehicle. Illustrative embodiments utilize, for example, an image capturing device, such as a camera, to capture the image of the vehicle and its license plate as the vehicle passes the road checkpoint. Illustrative embodiments also utilize, for example, at least one of automatic license plate number recognition technology, computer vision, image convolutional neural network, and the like to analyze the image of the vehicle and its license plate to determine the license plate number of the vehicle and attributes of the vehicle, such as vehicle make, vehicle model, vehicle body color, number of passengers, safety belts worn, and the like.

Further, in response to the vehicle passing the road checkpoint, illustrative embodiments retrieve vehicle record information corresponding to the vehicle from a traffic authority based on the vehicle license plate number. The vehicle record information corresponding to the vehicle includes basic information of the vehicle, such as, for example, vehicle owner, license plate number, vehicle identification number, vehicle registration number, vehicle make, vehicle model, vehicle body color, vehicle weight, number of axles, and the like. Illustrative embodiments also obtain geographic location information, such as, for example, GPS coordinates, corresponding to the road checkpoint, which the vehicle just passed. In addition, illustrative embodiments obtain related road network information, such as, for example, a road map, corresponding to the region surrounding the geographic location of the road checkpoint. Illustrative embodiments obtain the geographic location of the road checkpoint and the road network information corresponding to the region surrounding the geographic location of the road checkpoint from, for example, a geospatial information system.

A geospatial information system (GIS) relates to the physical mapping of data within a visual representation. Geospatial data is time-based data that is related to a specific location on the Earth's surface. Geospatial data typically combines location information (usually GPS coordinates) and attribute information (the characteristics of the object, event, or phenomena of concern) with temporal information (the time or life span at which the location and attributes exist). The location provided may be static (e.g., geolocation of a road checkpoint) or dynamic (e.g., a moving vehicle). Geospatial data can provide insights into relationships between variables and reveal patterns.

Illustrative embodiments generate vehicle travel data corresponding to the vehicle as the vehicle passes respective road checkpoints located along the toll road traveled by the vehicle. The vehicle travel data includes, for example, license plate number of the vehicle, attributes (e.g., make, model, and color) of the vehicle, region the vehicle is traveling in, road checkpoints passed by the vehicle, timestamps corresponding to when the vehicle passed each respective road checkpoint, and the like. Illustrative embodiments generate a data network analysis graph model of spatiotemporal traffic flow data by combining the vehicle traveling data, road checkpoint geographic locations information, and related road networks information. The data network analysis graph model of spatiotemporal traffic flow data includes a plurality of nodes and edges connecting certain nodes. The plurality of nodes includes, for example, license plate nodes, road checkpoint nodes, and vehicle attribute nodes. A license plate node contains a license plate number of a vehicle captured at a particular road checkpoint. A road checkpoint node identifies the particular road checkpoint and location where a particular license plate number was captured. A vehicle attribute node identifies a characteristic or feature (e.g., vehicle make, vehicle model, vehicle body color, or the like) of a particular vehicle that corresponds to a particular license plate number. Furthermore, it should be noted that an edge connecting two particular road checkpoint nodes includes a distance value, which indicates the vehicle travel distance (e.g., miles, kilometers, or the like) between those two particular road checkpoints. Moreover, an edge connecting a particular license plate node and a particular road checkpoint node includes a time value, which represents the timestamp of when that particular road checkpoint captured that particular license plate number as the vehicle passed.

In response to illustrative embodiments generating the data network analysis graph model of spatiotemporal traffic flow data, illustrative embodiments remove irrelevant nodes (e.g., those license plate nodes corresponding to license plate numbers that do not match the license plate number of the vehicle) from the data network analysis graph model of spatiotemporal traffic flow data. Further, illustrative embodiments remove any vehicle attributes nodes associated with those license plate nodes corresponding to the license plate numbers that do not match the license plate number of the vehicle.

In addition, in response to removing the irrelevant nodes from the data network analysis graph model, illustrative embodiments extract distance and time traveling information corresponding to the vehicle from the data network analysis graph model based on the license plate number of the vehicle. Then, illustrative embodiments determine a distance and time (i.e., spatiotemporal) mutually exclusive node relationship within the data network analysis graph model of spatiotemporal traffic flow data based on the distance and time traveling information corresponding to the vehicle extracted from the data network analysis graph model of spatiotemporal traffic flow data. For example, illustrative embodiments can determine a distance and time mutually exclusive node relationship between two particular license plate nodes when the vehicle travel distance and time conflict between those two particular license plate nodes and their corresponding road checkpoint nodes. In other words, the distance traveled by a particular vehicle corresponding to a particular license plate number exceeds a maximum time threshold level (i.e., that particular vehicle moving at a calculated average speed cannot travel the distance from one particular road checkpoint to the next road checkpoint within the time period defined by the timestamps corresponding to those two road checkpoints).

Afterward, illustrative embodiments identify an anomalous license plate node in the data network analysis graph model of spatiotemporal traffic flow data based on the determined distance and time mutually exclusive node relationship. Illustrative embodiments perform a set of action steps regarding an anomalous license plate number corresponding to the anomalous license plate node. The set of action steps include, for example, sending a notification to the traffic authority regarding the anomalous license plate number and corresponding vehicle attributes for investigation, sending a notification to road checkpoints regarding the anomalous license plate number and corresponding vehicle attributes for faster identification and alerting of the traffic authority, and the like.

In response to illustrative embodiments identifying a partially obstructed license plate having missing license plate information (i.e., one or more missing numbers and/or letters), illustrative embodiments generate a plurality of subgraphs indicating relationships between license plate nodes within the data network analysis graph model of spatiotemporal traffic flow data. Each respective subgraph contains a license plate node, a set of vehicle attribute nodes that corresponds to the license plate node, and a road checkpoint node that corresponds to the license plate node. Illustrative embodiments utilize a similarity algorithm, such as, for example, a Jaccard similarity algorithm, graph convolutional neural network algorithm, or the like, to analyze and determine similarity between each pair of subgraphs within the plurality of subgraphs identifying common neighbors based on fusion or merging of information corresponding to nodes and edges contained in each particular pair of subgraphs.

Illustrative embodiments generate a similarity confidence score for each particular pair of subgraphs based on the determined amount of similarity between each pair of subgraphs. For example, illustrative embodiments determine whether license plates corresponding to two particular license plate nodes are the same or not based on an amount of vehicle attribute similarity corresponding to vehicle attribute nodes connected via edges to those particular license plate nodes. In other words, an increased amount of vehicle attribute similarity (e.g., same vehicle make, model, and body color) between those particular license plate nodes equals an increased similarity confidence score indicating that the license plates corresponding to those particular license plate nodes are most likely the same. Conversely, a decreased amount of vehicle attribute similarity between those particular license plate nodes equals a decreased similarity confidence score indicating that the license plates corresponding to those particular license plate nodes are most likely different (i.e., not the same).

Illustrative embodiments utilize a predefined similarity confidence score threshold level to determine whether the license plates corresponding to those particular license plate nodes are the same or not. The predefined similarity confidence score threshold level is based on, for example, subject matter expert experience. The predefined similarity confidence score threshold level can be, for example, 0.6, 0.65, 0.7, 0.75, 0.8, 0.85, 0.9, or the like. As an illustrative example, if illustrative embodiments determine the similarity confidence score between two subgraphs is equal to 0.84 and the predefined similarity confidence score threshold level is set at 0.8 based on subject matter expert experience, then illustrative embodiments determine that the license plate corresponding to those two subgraphs is the same even though one of the license plates is partially obscured either intentionally (e.g., a vehicle owner deliberately placing a piece of material, such as plastic, cardboard, tape, or the like, over one or more numbers on the license plate) or unintentionally (e.g., mud splash, damage due to accident, corrosion, or the like causing numbers to be obscured).

Thus, illustrative embodiments provide one or more technical solutions that overcome a technical problem with an inability of current solutions to automatically detect and identify invalid and missing vehicle license plate information. As a result, these one or more technical solutions provide a technical effect and practical application in the field of vehicle license plate information auditing.

With reference now to FIG. 2, a diagram illustrating an example of a vehicle license plate auditing system is depicted in accordance with an illustrative embodiment. Vehicle license plate auditing system 201 may be implemented in a computing environment, such as computing environment 100 in FIG. 1. Vehicle license plate auditing system 201 is a system of hardware and software components for detecting vehicle license plate anomaly based on distance and time mutually exclusive node relationships and subgraph similarities using vehicle data fusion.

In this example, vehicle license plate auditing system 201 includes computer 202, road checkpoint 204, geospatial information system 206, and traffic authority system 208. Computer 202 may be, for example, computer 101 in FIG. 1, and can represent a plurality of computers. Road checkpoint 204 is a toll station located on toll road 210 and can represent a plurality of road checkpoints located along toll road 210. Geospatial information system 206 provides geospatial information corresponding to a particular region, country, continent, or the like and can represent a plurality of geospatial information systems. Traffic authority system 208 corresponds to a traffic authority that manages toll road 210. Toll road 210 can represent a plurality of different toll roads and traffic authority system 208 can represent a plurality of different traffic authority systems that manage the plurality of different toll roads. However, it should be noted that vehicle license plate auditing system 201 is intended as an example only and not as a limitation on illustrative embodiments. In other words, vehicle license plate auditing system 201 can include any number of computers, road checkpoints, geospatial information systems, traffic authority systems, toll roads, and other devices, systems, and components not shown.

Computer 202 utilizes vehicle sensor 212 to detect vehicle 214 passing road checkpoint 204. As a result, vehicle 214 becomes a target vehicle. It should be noted that vehicle 214 can represent a plurality of different vehicles traveling on toll road 210. In response to detecting vehicle 214 passing road checkpoint 204, computer 202 utilizes image capturing device 216 to capture image 218 of vehicle 214 and license plate 220 on vehicle 214. In addition, computer 202 utilizes timestamp component 222 to generate timestamp 224 indicating the time when vehicle 214 passed road checkpoint 204 and image 218 was captured. Further, computer 202 utilizes license plate number recognition component 226 to identify license plate number 228 of license plate 220 on vehicle 214.

Furthermore, computer 202 retrieves road checkpoint geographic location information 230 and related road network information 232 that correspond to road checkpoint 204 from geospatial information system 206. Road checkpoint geographic location information 230 identifies the exact geolocation of road checkpoint 204 and may include, for example, GPS coordinates. Related road network information 232 represents information, such as, for example, a road map, that shows roadways and distance measurements within the region surrounding the geolocation of road checkpoint 204.

Moreover, computer 202 retrieves vehicle record information 234 corresponding to vehicle 214 from traffic authority system 208 based on license plate number 228 of license plate 220 on vehicle 214. Vehicle record information 234 includes, for example, owner of vehicle 214, license plate number of vehicle 214, vehicle identification number of vehicle 214, vehicle registration number of vehicle 214, make of vehicle 214, model of vehicle 214, body color of vehicle 214, weight of vehicle 214, number of axles on vehicle 214, and the like. Computer 202 can compare vehicle record information 234 with information, such as, for example, attributes of vehicle 214, derived from the analysis of image 218 of vehicle 214 captured at road checkpoint 204 to determine whether a match exists between vehicle record information 234 and the information derived from the analysis of image 218.

Computer 202 then generates data network analysis graph model 236 based on all the information collected from road checkpoint 204, geospatial information system 206, and traffic authority system 208. Data network analysis graph model 236 contains spatiotemporal (i.e., distance and time) traffic flow data corresponding to vehicle 214 and a set of other vehicles as vehicle 214 and the set of other vehicles pass road checkpoints along toll road 210.

Figure 3A:
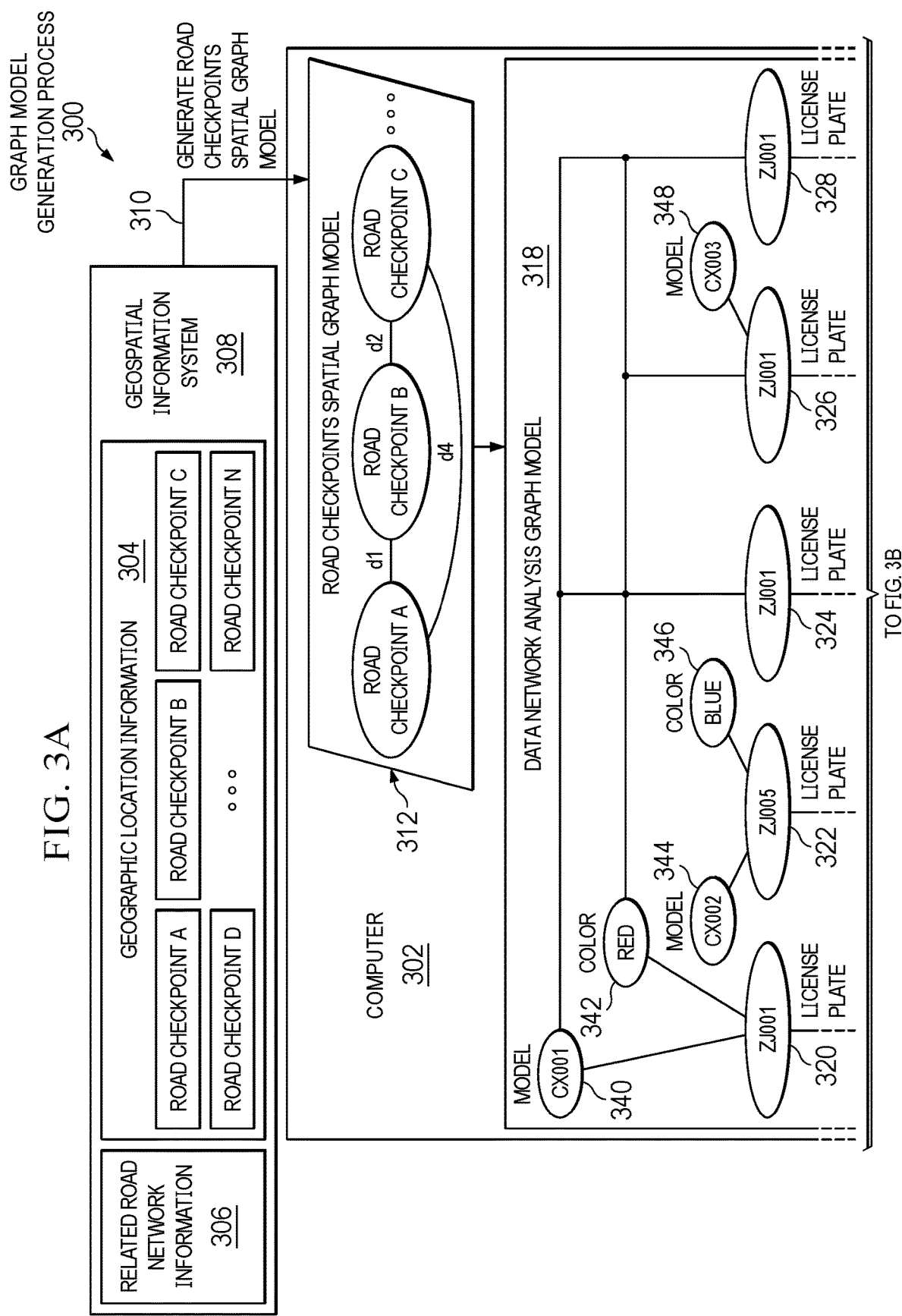
FIGS. 3A-3B are a diagram illustrating an example of a graph model generation process in accordance with an illustrative embodiment.
Figure 3B:
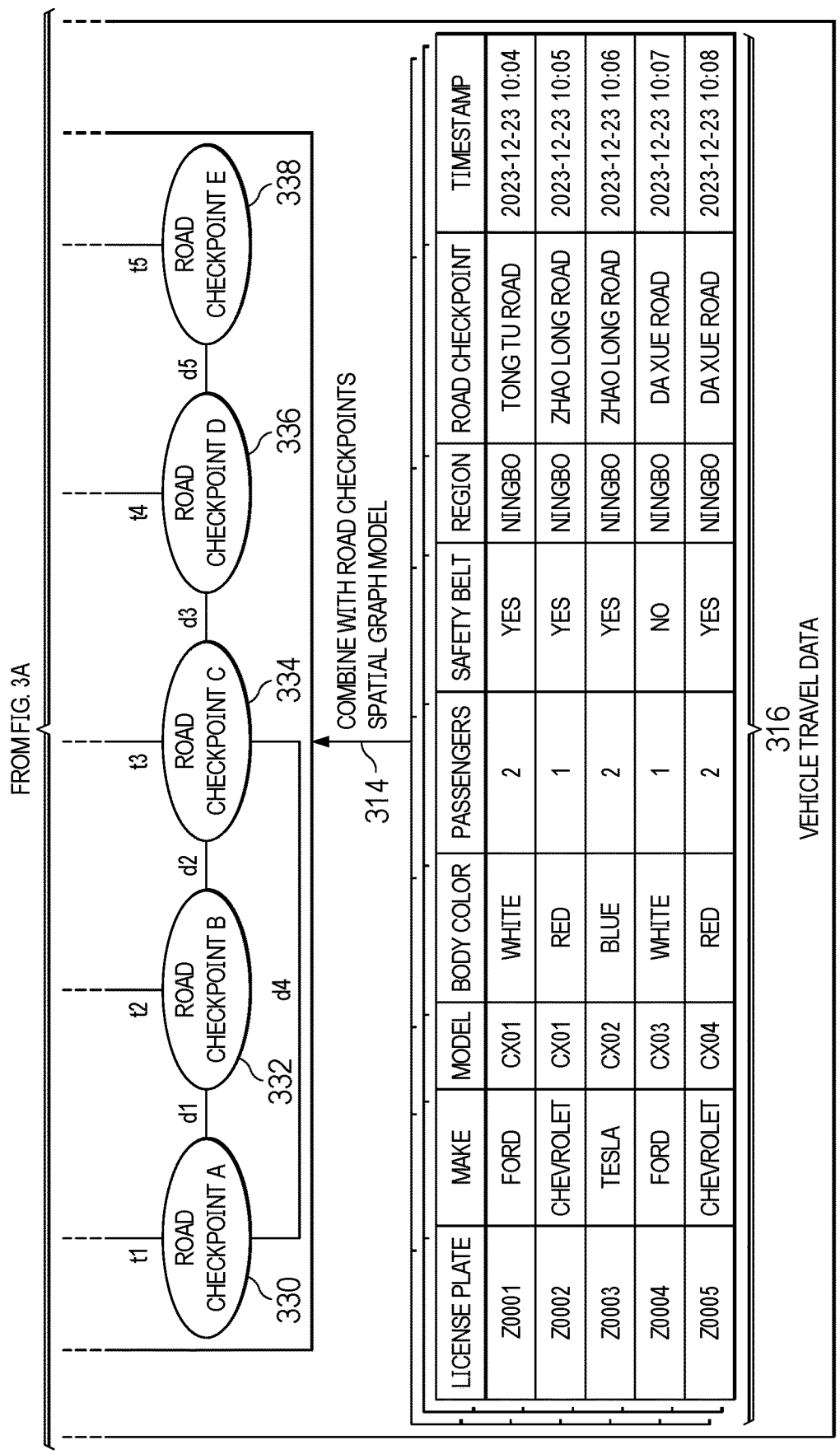

With reference now to FIGS. 3A-3B, a diagram illustrating an example of a graph model generation process is depicted in accordance with an illustrative embodiment. Graph model generation process 300 is implemented in computer 302, such as, for example, computer 202 in FIG. 2.

In this example, computer 302 retrieves geographic location information 304 and related road network information 306 from geospatial information system 308 in response to a vehicle passing a road checkpoint. Geographic location information 304, related road network information 306, and geospatial information system 308 may be, for example, road checkpoint geographic location information 230, related road network information 232, and geospatial information system 206 in FIG. 2. The vehicle, which is the target vehicle, and the road checkpoint may be, for example, vehicle 214 and road checkpoint 204 in FIG. 2.

In this example, geographic location information 304 includes data identifying the geographic location of a plurality of road checkpoints, such as road checkpoint A, road checkpoint B, road checkpoint C, road checkpoint D, to road checkpoint N, located along the toll road. The toll road may be, for example, toll road 210 in FIG. 2. Related road network information 306 identifies roadways and distances within regions surrounding each respective road checkpoint located along the toll road.

At 310, computer 302 generates road checkpoints spatial graph model 312 based on geographic location information 304 and related road network information 306. Road checkpoints spatial graph model 312 illustrates the geolocation of each respective road checkpoint in relation to each other as road checkpoint nodes and toll roads connecting road checkpoints as edges between road checkpoint nodes. In addition, it should be noted that each edge between a given pair of road checkpoints includes a distance value, such as d1, d2, and d4.

At 314, computer 302 combines vehicle travel data 316 with road checkpoints spatial graph model 312 to generate data network analysis graph model 318. Vehicle travel data 316 contains information regarding different vehicles passing different road checkpoints. In this example, vehicle travel data 316 includes information such as vehicle license plate number, vehicle make, vehicle model, vehicle body color, number of passengers in vehicle, safety belts worn in vehicle, region, road checkpoint, and timestamp. However, it should be noted that vehicle travel data 316 is intended as an example only and not as a limitation on illustrative embodiments. For example, vehicle travel data 316 may include more or less information than shown. Computer 302 may generate vehicle travel data 316 based on results of image analysis of captured images of vehicles passing respective road checkpoints and retrieving vehicle record information, such as, for example, vehicle record information 234 in FIG. 2, from a traffic authority.

Data network analysis graph model 318 may be, for example, data network analysis graph model 236 in FIG. 2. Data network analysis graph model 318 contains spatiotemporal traffic flow data represented as a plurality of nodes and edges connecting the nodes. In this example, data network analysis graph model 318 includes license plate node 320, license plate node 322, license plate node 324, license plate node 326, license plate node 328, road checkpoint A node 330, road checkpoint B node 332, road checkpoint C node 334, road checkpoint D node 336, and road checkpoint E node 338. However, it should be noted that data network analysis graph model 318 is intended as an example only and can include any number of license plate nodes and road checkpoint nodes.

Each license plate node contains a vehicle license plate number captured at a particular road checkpoint. In this example, license plate node 320, license plate node 324, license plate node 326, and license plate node 328 contain the license plate number ZJ001 and license plate node 322 contains the license plate number ZJ005. In addition, each edge between a particular license plate node and a particular road checkpoint node contains a time value. For example, the edge between license plate node 320 and road checkpoint A node 330 contains the time value t1, which represents the timestamp of when the vehicle corresponding to license plate node 320 passed road checkpoint A node 330. Similarly, the edge between license plate node 322 and road checkpoint B node 332 contains the time value t2, which represents the timestamp of when the vehicle corresponding to license plate node 322 passed road checkpoint B node 332, the edge between license plate node 324 and road checkpoint C node 334 contains the time value t3, which represents the timestamp of when the vehicle corresponding to license plate node 324 passed road checkpoint C node 334, the edge between license plate node 326 and road checkpoint D node 336 contains the time value t4, which represents the timestamp of when the vehicle corresponding to license plate node 326 passed road checkpoint D node 336, and the edge between license plate node 328 and road checkpoint E node 338 contains the time value t5, which represents the timestamp of when the vehicle corresponding to license plate node 328 passed road checkpoint E node 338.

Further, each edge between road checkpoint nodes contains a distance value. For example, the edge between road checkpoint A node 330 and road checkpoint B node 332 contains the distance value d1, which represents the vehicle travel distance between road checkpoint A node 330 and road checkpoint B node 332. Similarly, the edge between road checkpoint B node 332 and road checkpoint C node 334 contains the distance value d2, which represents the vehicle travel distance between road checkpoint B node 332 and road checkpoint C node 334, the edge between road checkpoint C node 334 and road checkpoint D node 336 contains the distance value d3, which represents the vehicle travel distance between road checkpoint C node 334 and road checkpoint D node 336, the edge between road checkpoint A node 330 and road checkpoint C node 334 contains the distance value d4, which represents the vehicle travel distance between road checkpoint A node 330 and road checkpoint C node 334, and the edge between road checkpoint D node 336 and road checkpoint E node 338 contains the distance value d5, which represents the vehicle travel distance between road checkpoint D node 336 and road checkpoint E node 338.

Data network analysis graph model 318 also includes vehicle attribute nodes connected via edges to particular license plate nodes. A vehicle attribute node identifies a characteristic or feature of a vehicle that corresponds to a particular license plate node. For example, vehicle attribute node 340 identifies a vehicle model of CX001 and vehicle attribute node 342 identifies a vehicle body color of red corresponding to license plate node 320, license plate node 324, and license plate node 328. Similarly, vehicle attribute node 344 identifies a vehicle model of CX002 and vehicle attribute node 346 identifies a vehicle body color of blue corresponding to license plate node 322. Also, vehicle attribute node 348 identifies a vehicle model of CX003 and vehicle attribute node 342 identifies a vehicle body color of red corresponding to license plate node 326.

Figure 4A:
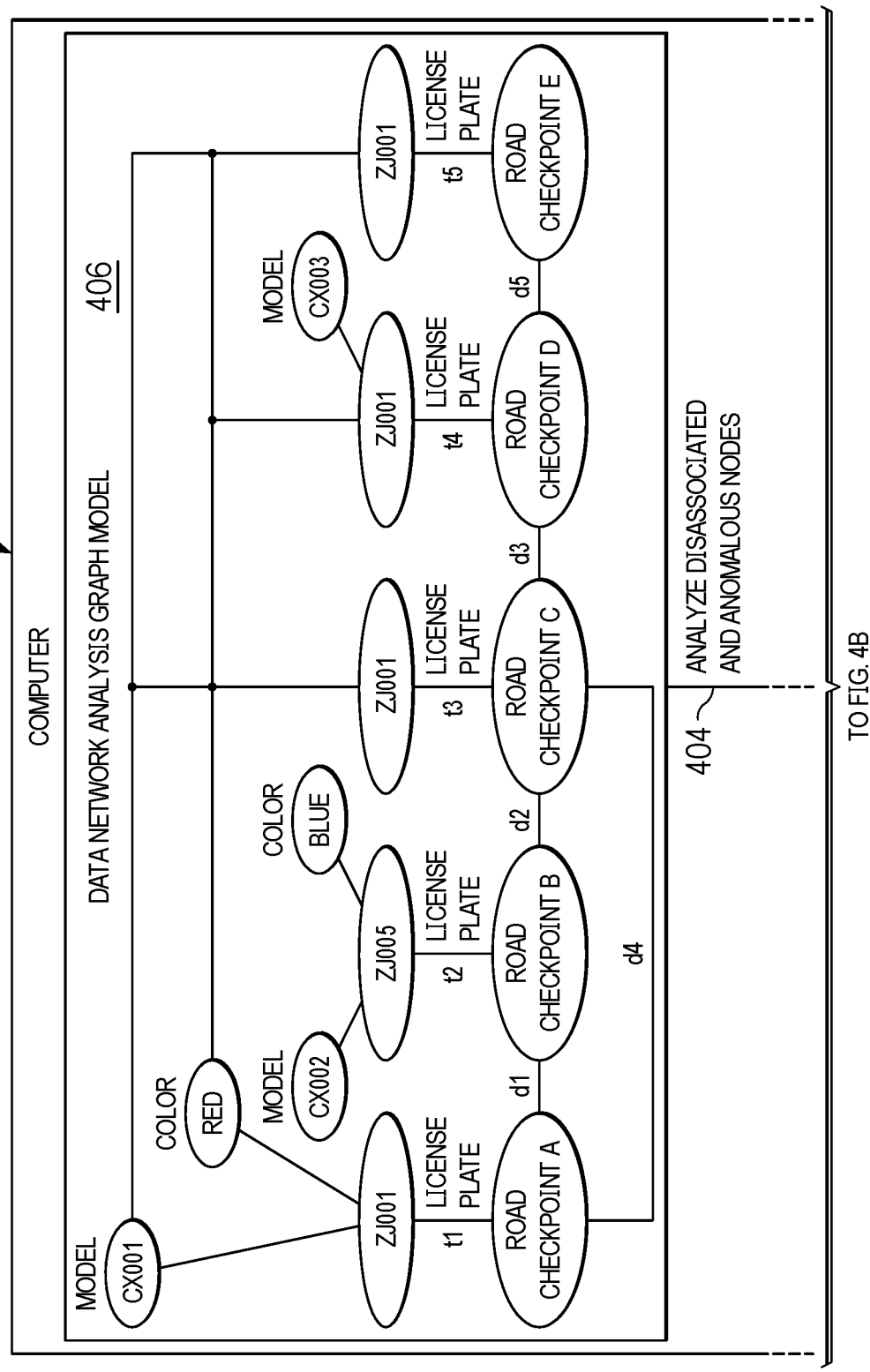
FIGS. 4A-4C are a diagram illustrating an example of a process for vehicle license plate auditing based on distance-time mutually exclusive node relationships in accordance with an illustrative embodiment.
Figure 4B:
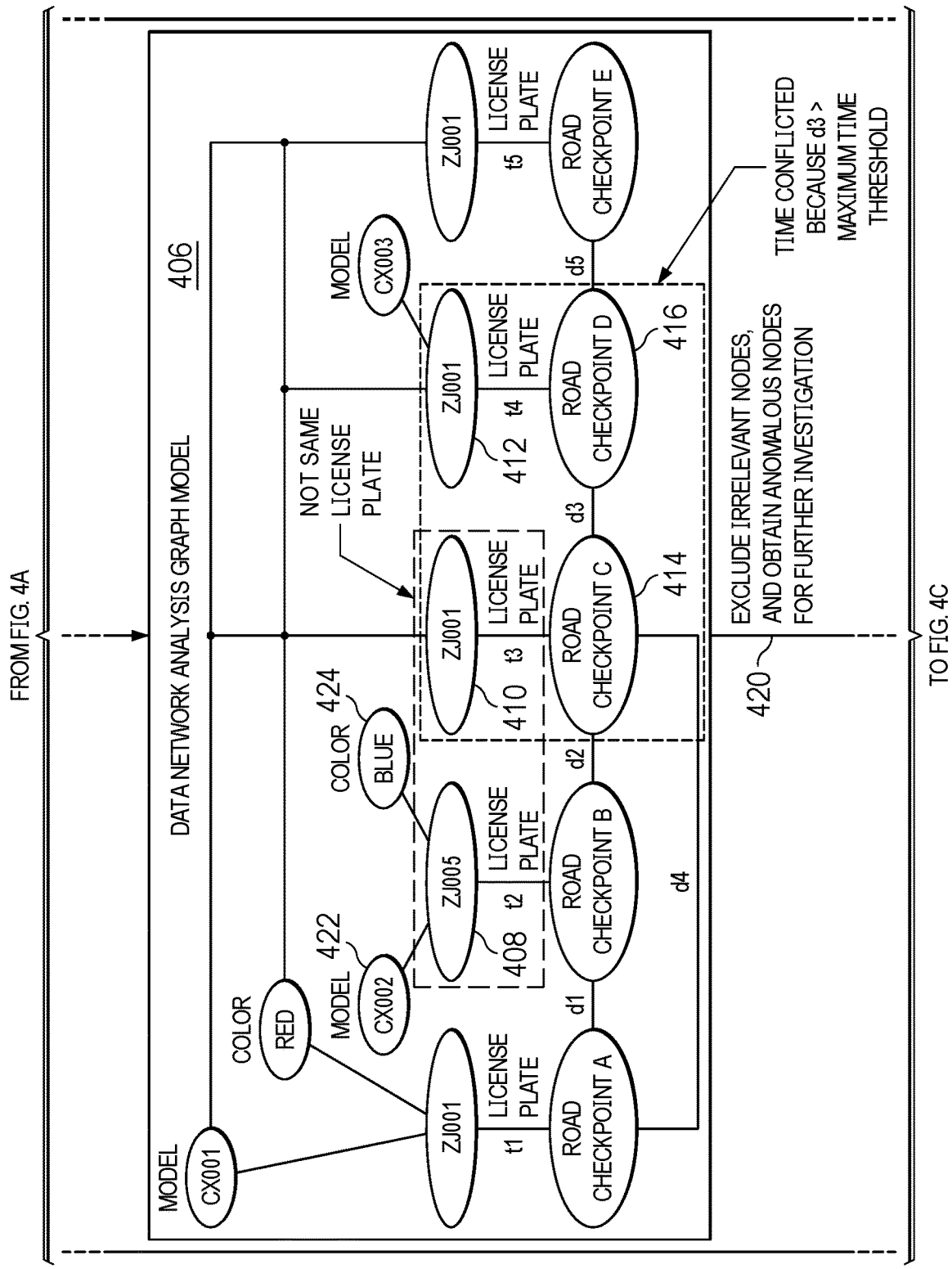
Figure 4C:
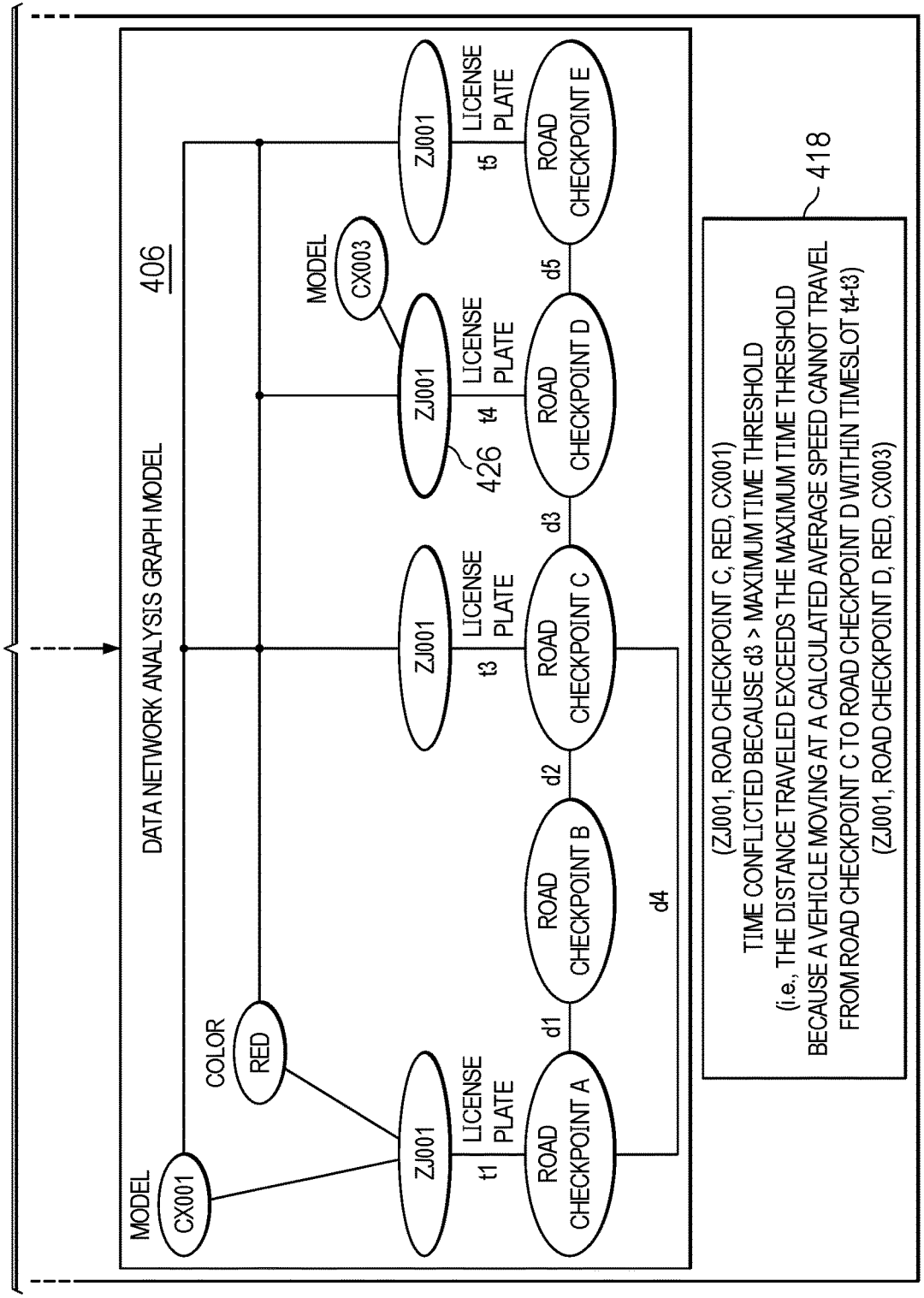

With reference now to FIGS. 4A-4C, a diagram illustrating an example of a process for vehicle license plate auditing based on distance-time mutually exclusive node relationships is depicted in accordance with an illustrative embodiment. Vehicle license plate auditing based on distance-time mutually exclusive node relationship process 400 is implemented in computer 402, such as, for example, computer 302 in FIGS. 3A-3B.

In this example, at 404, computer 402 analyzes data network analysis graph model 406 for disassociated and anomalous nodes. Data network analysis graph model 406 may be, for example, data network analysis graph model 318 in FIGS. 3A-3B. In response to analyzing data network analysis graph model 406 for disassociated and anomalous nodes, computer 402 determines that license plate node 408 and license plate node 410 do not contain the same vehicle license plate number (i.e., license plate node 408 contains vehicle license plate number ZJ005 and license plate node 410 contains vehicle license plate number ZJ001). In other words, license plate node 408 and license plate node 410 represent disassociated license plate nodes in data network analysis graph model 406. License plate node 408 and license plate node 410 may be, for example, license plate node 322 and license plate node 324 in FIG. 3A. Further in response to analyzing data network analysis graph model 406 for disassociated and anomalous nodes, computer 402 determines that license plate node 410 and license plate node 412 are distance and time conflicted because the distance value d3 between road checkpoint C 414 and road checkpoint D 416 exceeds a defined maximum time threshold value as shown at 418. Road checkpoint C 414 and road checkpoint D 416 may be, for example, road checkpoint C node 334 and road checkpoint D node 336 in FIG. 3B.

At 420, computer 402 excludes irrelevant nodes and obtains anomalous nodes in data network analysis graph model 406. As a result, computer 402 excludes license plate node 408 and corresponding vehicle attribute node 422 and vehicle attribute node 424 as irrelevant from data network analysis graph model 406 because of the determined disassociation between license plate node 408 and license plate node 410. Moreover, computer 402 identifies license plate node 426, which is the same as license plate node 412, as an anomalous license plate node because of the determined distance and time mutually exclusive node relationship between license plate node 410 and license plate node 412. Further, it should be noted that the vehicle model attribute of CX001 associated with license plate node 410 is different from the vehicle model attribute of CX003 associated with license plate node 412. As result, computer 402 notifies the traffic authority to investigate the license plate number associated with license plate node 426 as potentially being a shielded license plate using, for example, a discarded, fabricated, or stolen license plate.

Figure 5A:
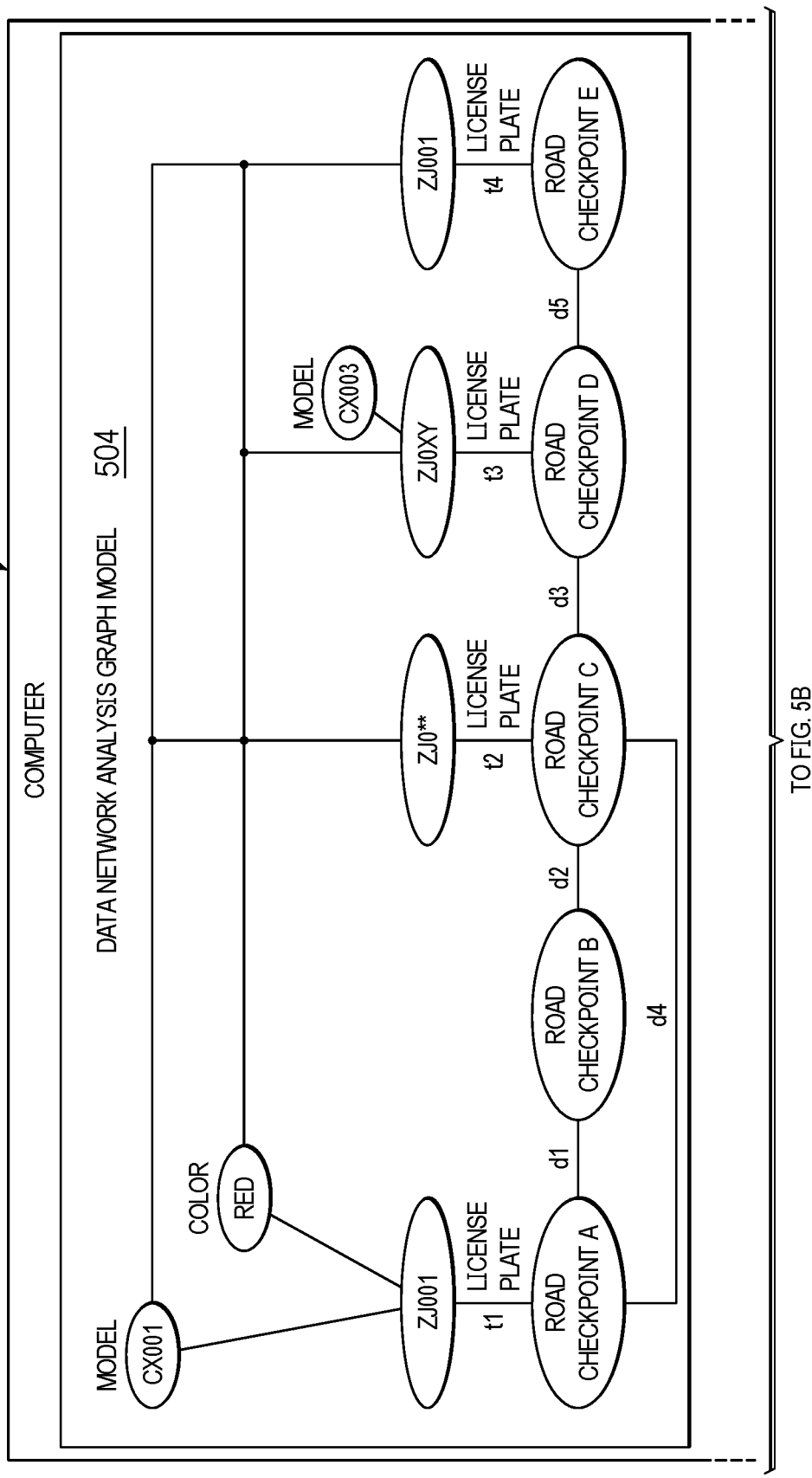
FIGS. 5A-5C are a diagram illustrating an example of a process for vehicle license plate auditing based on subgraph similarity analysis in accordance with an illustrative embodiment.
Figure 5B:
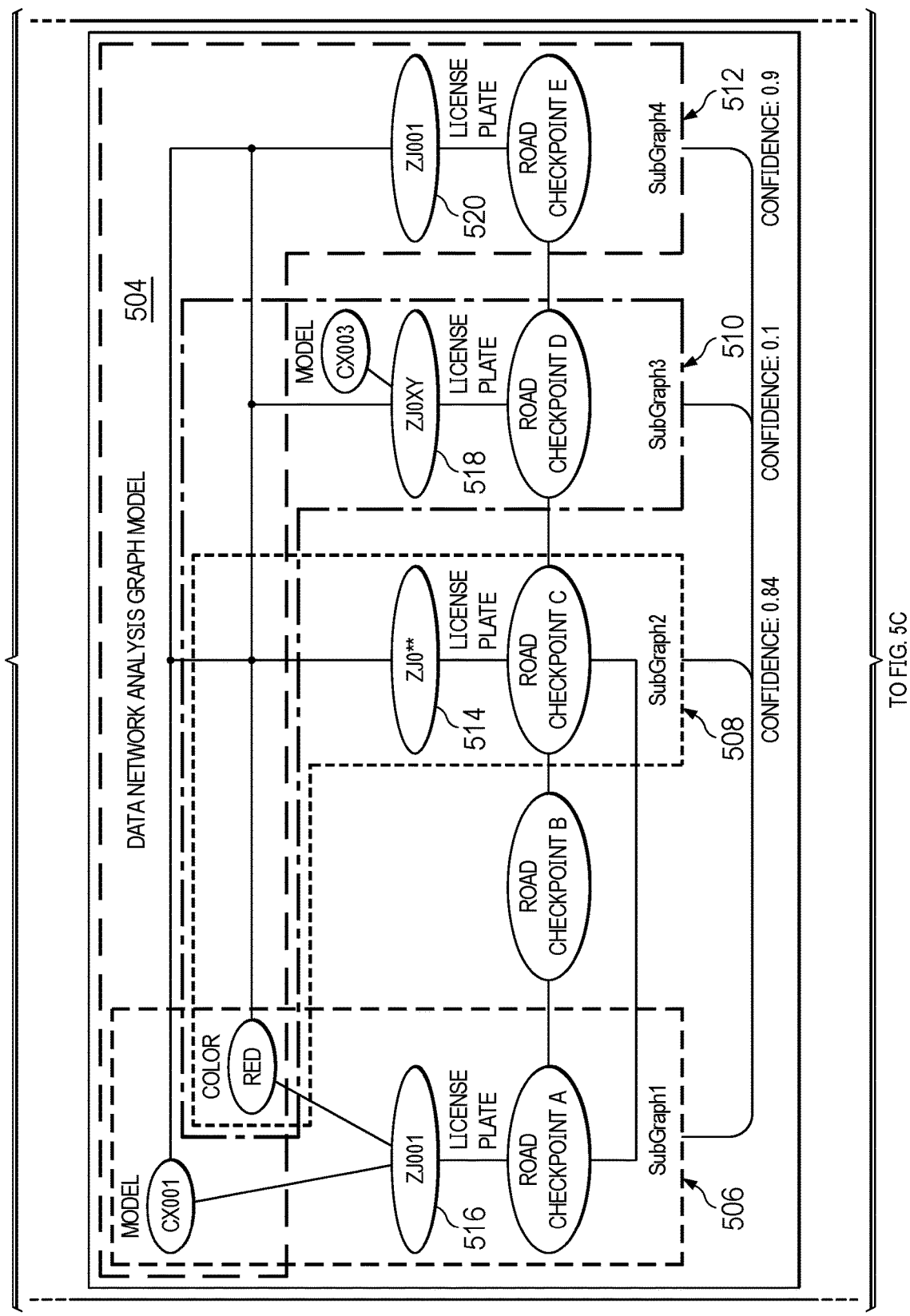
Figure 5C:
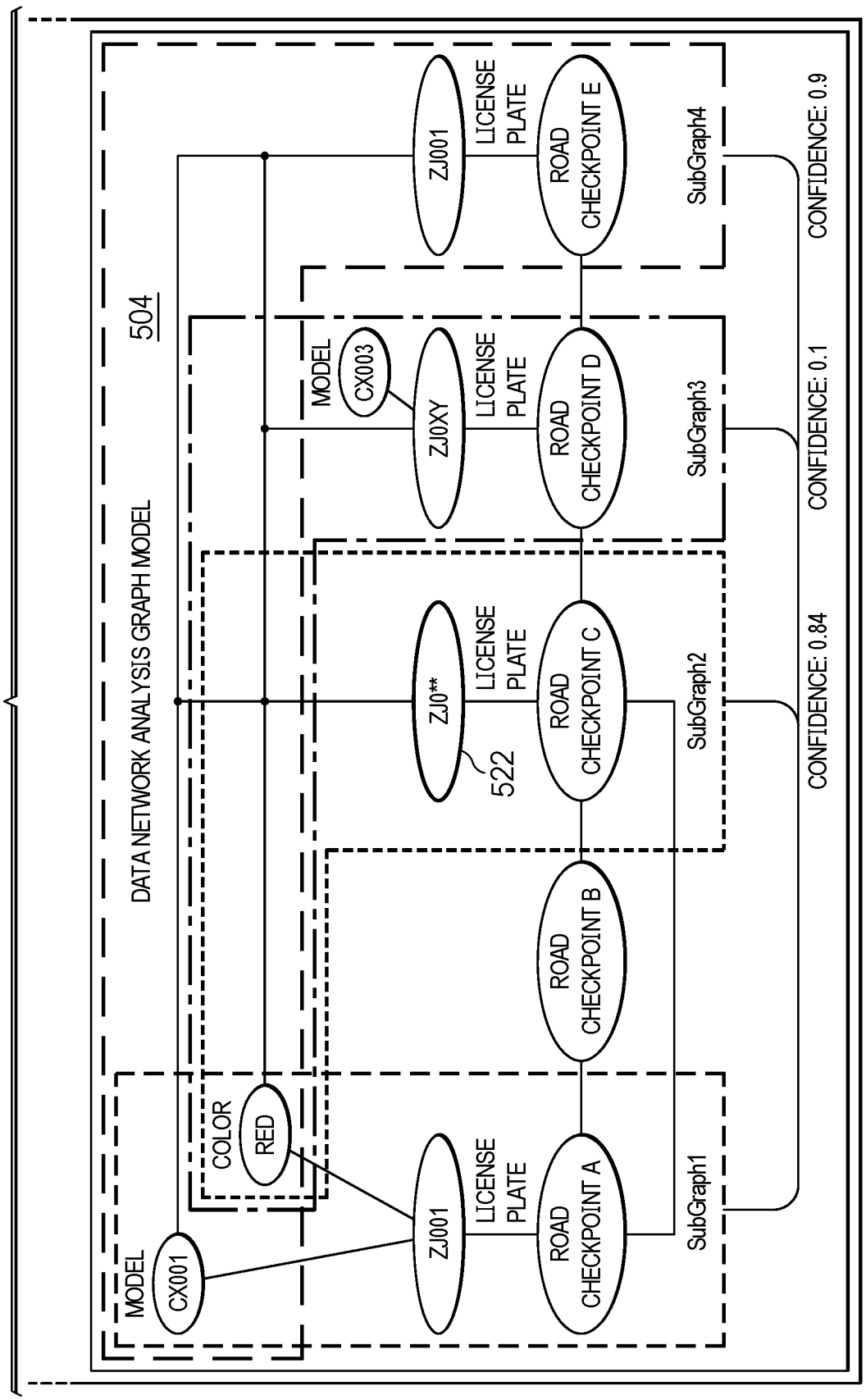
Figure 6B:
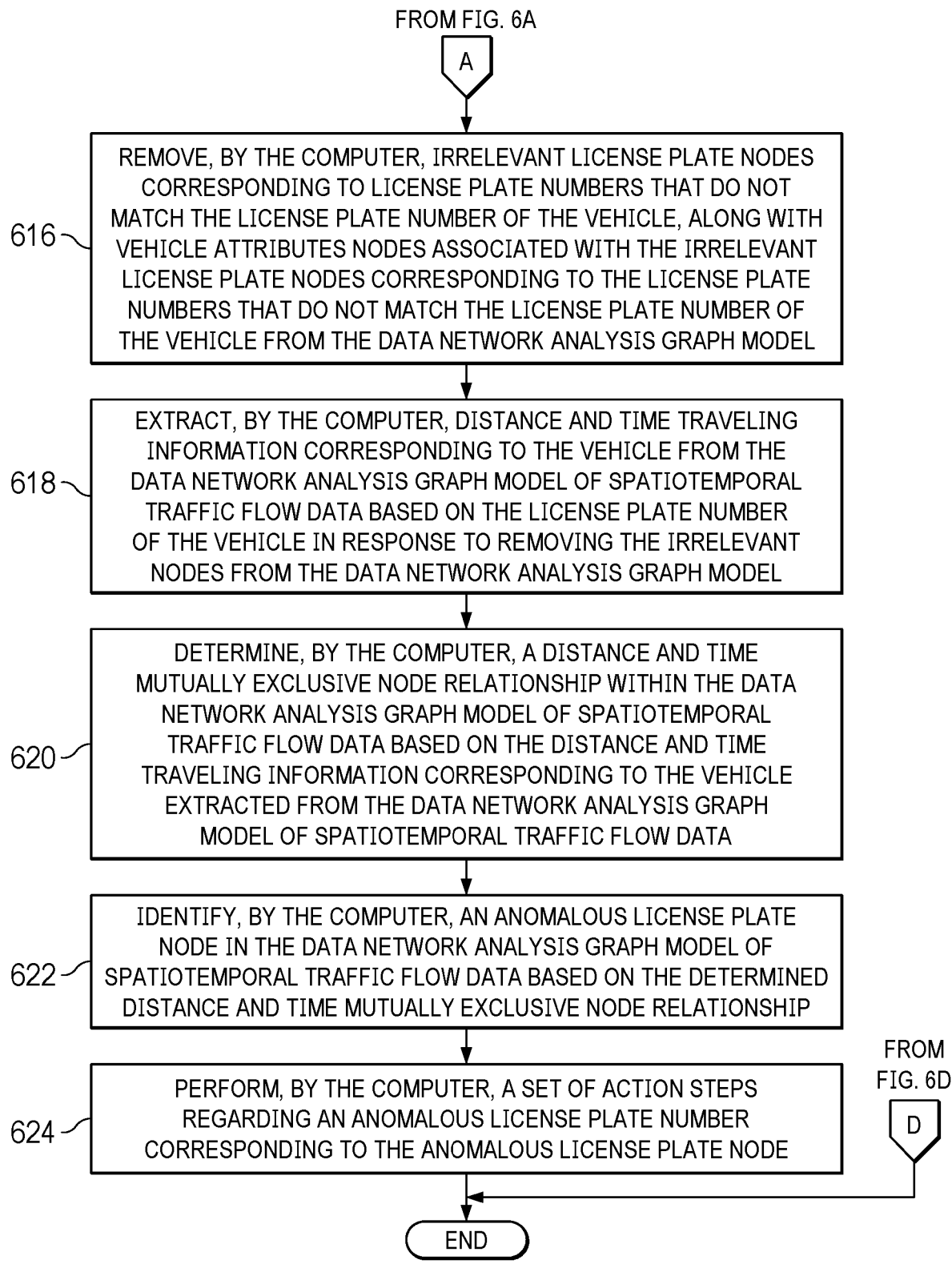
Figure 6C:
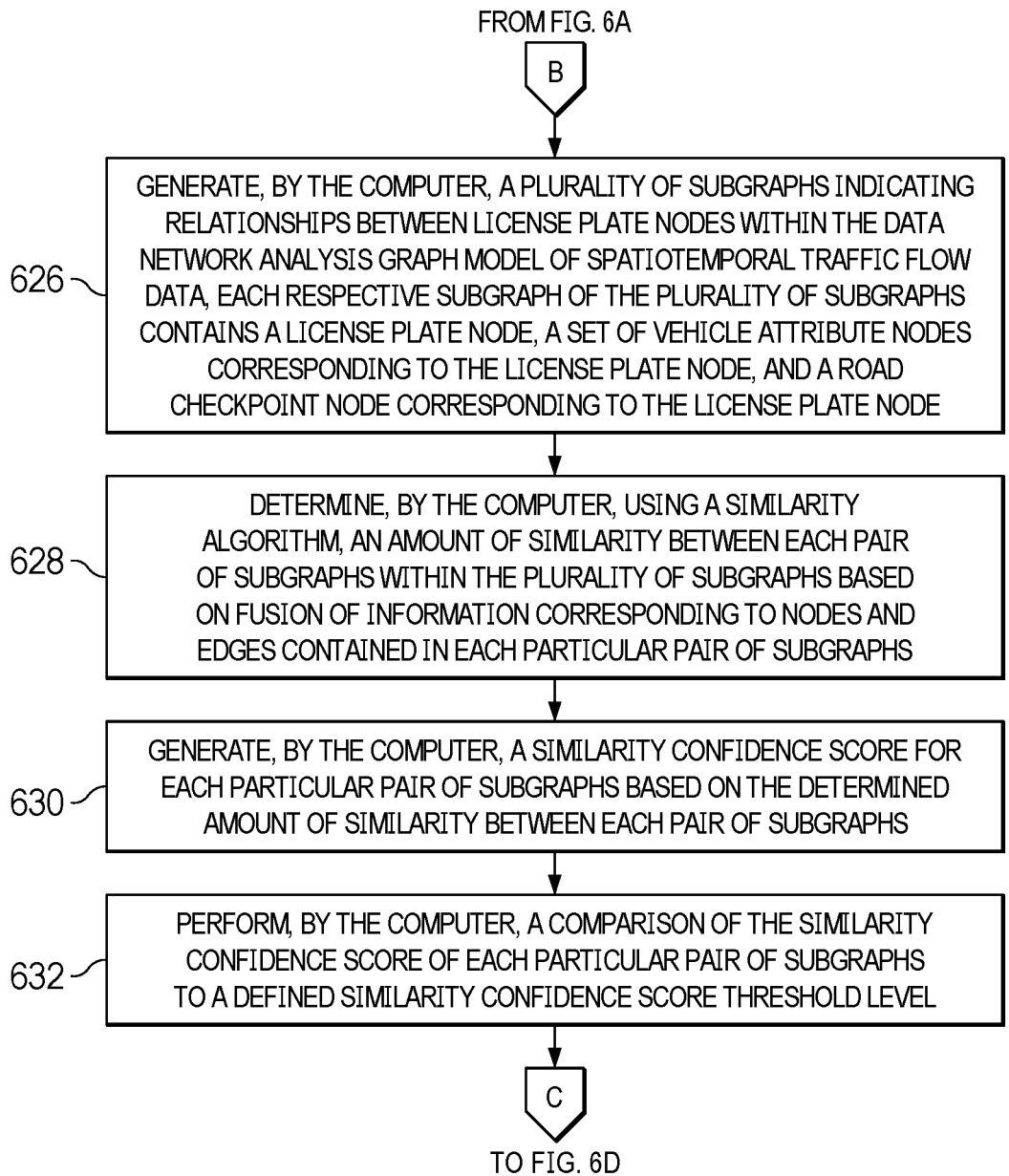
Figure 6D:
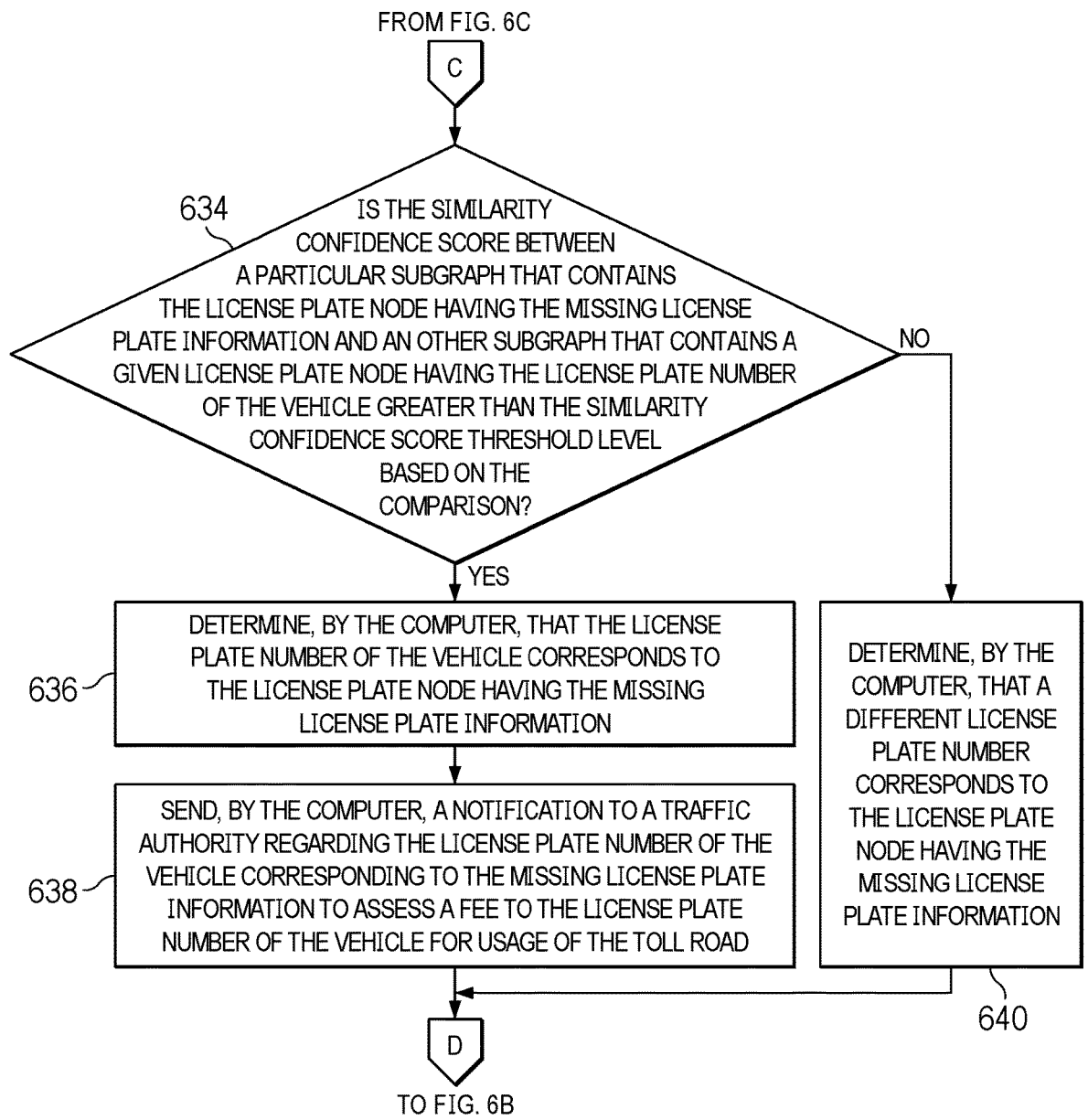

With reference now to FIGS. 5A-5C, a diagram illustrating an example of a process for vehicle license plate auditing based on subgraph similarity analysis is depicted in accordance with an illustrative embodiment. Vehicle license plate auditing based on subgraph similarity process 500 is implemented in computer 502, such as, for example, computer 402 in FIGS. 4A-4C.

In this example, computer 502 divides data network analysis graph model 504, such as, for example, data network analysis graph model 406 in FIG. 4C, into subgraph 1 506, subgraph 2 508, subgraph 3 510, and subgraph 4 512 in response to identifying missing license plate information (e.g., a partially obstructed license plate) associated with license plate node 514. It should be noted that each respective subgraph contains one license plate node, a set of vehicle attributes corresponding to that particular license plate node, and one road checkpoint node corresponding to that particular license plate node.

Further, computer 502 utilizes a similarity algorithm to perform subgraph similarity between subgraph 506, subgraph 508, subgraph 510, and subgraph 512 and generates a similarity confidence score for each similarity comparison. For example, computer 502 generates a similarity confidence score of 0.84 between subgraph 1 506 and subgraph 2 508, a similarity confidence score of 0.1 between subgraph 1 506 and subgraph 3 510, and a similarity confidence score of 0.9 between subgraph 1 506 and subgraph 4 512 based on similarities between vehicle attribute values and vehicle license numbers. In addition, computer 502 compares respective similarity confidence scores to a predefined similarity confidence score threshold level, such as, for example, 0.6.

In this example, based on the comparison of the respective similarity confidence scores to the predefined similarity confidence score threshold level, computer 502 determines that license plate number ZJ0 having missing information associated with license plate node 514 is the same as license plate number ZJ001 associated with license plate node 516 based on the similarity confidence score of 0.84, that license plate number ZJ0XY associated with license plate node 518 is different from license plate number ZJ001 associated with license plate node 516 based on the similarity confidence score of 0.1, and that license plate number ZJ001 associated with license plate node 520 is the same as license plate number ZJ001 associated with license plate node 516 based on the similarity confidence score of 0.9. As a result, based on the vehicle license plate audit, computer 502 notifies the traffic authority that license plate number ZJ0 associated with license plate node 522 is the same as license plate number ZJ001 to investigate and assess fees accordingly. In other words, computer 502 determined that ZJ0 is abnormal and can represent a partially obscured license plate, which requires further investigation and processing. It should be noted that in this example, license plate node 522 is the same as license plate node 514**.

With reference now to FIGS. 6A-6D, a flowchart illustrating a process for vehicle license plate auditing is shown in accordance with an illustrative embodiment. The process shown in FIGS. 6A-6D may be implemented in a computer, such as, for example, computer 101 in FIG. 1 or computer 202 in FIG. 2. For example, the process shown in FIGS. 6A-6D may be implemented vehicle license plate auditing code 200 in FIG. 1.

The process begins when the computer captures an image of a vehicle and its license plate using an imaging device at a road checkpoint located along a toll road traveled by the vehicle as the vehicle passes the road checkpoint, along with a timestamp of when the image was captured (step 602). The computer performs an analysis of the image of the vehicle and its license plate (step 604). The computer utilizes at least one of automatic license plate number recognition technology, computer vision, and an image convolutional neural network to perform the analysis of the image.

The computer determines a license plate number of the license plate on the vehicle and attributes of the vehicle based on the analysis of the image of the vehicle and its license plate (step 606). In addition, the computer obtains geographic location information corresponding to the road checkpoint passed by the vehicle from a geospatial information system (step 608).

The computer generates vehicle travel data corresponding to the vehicle that includes the attributes of the vehicle as the vehicle passes respective road checkpoints located along the toll road traveled by the vehicle (step 610). Further, the computer generates a data network analysis graph model containing spatiotemporal traffic flow data by combining the vehicle traveling data with the geographic location information corresponding to the respective road checkpoints passed by the vehicle along the toll road (step 612).

The computer makes a determination as to whether the data network analysis graph model includes a license plate node that has missing license plate information (step 614). If the computer determines that the data network analysis graph model does not include a license plate node that has missing license plate information, no output of step 614, then the computer removes irrelevant license plate nodes corresponding to license plate numbers that do not match the license plate number of the vehicle, along with vehicle attributes nodes associated with the irrelevant license plate nodes corresponding to the license plate numbers that do not match the license plate number of the vehicle, from the data network analysis graph model (step 616).

The computer extracts distance and time traveling information corresponding to the vehicle from the data network analysis graph model based on the license plate number of the vehicle in response to removing the irrelevant nodes from the data network analysis graph model (step 618). The computer determines a distance and time mutually exclusive node relationship within the data network analysis graph model of spatiotemporal traffic flow data based on the distance and time traveling information corresponding to the vehicle extracted from the data network analysis graph model of spatiotemporal traffic flow data (step 620).

The computer determines an anomalous license plate node in the data network analysis graph model of spatiotemporal traffic flow data based on the determined distance and time mutually exclusive node relationship (step 622). The computer performs a set of action steps regarding an anomalous license plate number corresponding to the anomalous license plate node (step 624). Thereafter, the process terminates.

Returning again to step 614, if the computer determines that the data network analysis graph model does include a license plate node that has missing license plate information, yes output of step 614, then the computer generates a plurality of subgraphs indicating relationships between license plate nodes within the data network analysis graph model of spatiotemporal traffic flow data (step 626). Each respective subgraph of the plurality of subgraphs contains a license plate node, a set of vehicle attribute nodes corresponding to the license plate node, and a road checkpoint node corresponding to the license plate node.

The computer, using a similarity algorithm, determines an amount of similarity between each pair of subgraphs within the plurality of subgraphs based on fusion of information corresponding to nodes and edges contained in each particular pair of subgraphs (step 628). The similarity algorithm is one of a Jaccard similarity algorithm or a graph convolutional neural network algorithm. Furthermore, the computer generates a similarity confidence score for each particular pair of subgraphs based on the determined amount of similarity between each pair of subgraphs (step 630). The computer performs a comparison of the similarity confidence score of each particular pair of subgraphs to a defined similarity confidence score threshold level (step 632).

The computer makes a determination as to whether the similarity confidence score between a particular subgraph that contains the license plate node having the missing license plate information and an other subgraph that contains a given license plate node having the license plate number of the vehicle is greater than the similarity confidence score threshold level based on the comparison (step 634). If the computer determines that the similarity confidence score between the particular subgraph that contains the license plate node having the missing license plate information and the other subgraph that contains the given license plate node having the license plate number of the vehicle is greater than the similarity confidence score threshold level based on the comparison, yes output of step 634, then the computer determines that the license plate number of the vehicle corresponds to the license plate node having the missing license plate information (step 636). Moreover, the computer sends a notification to a traffic authority regarding the license plate number of the vehicle corresponding to the missing license plate information to assess a fee to the license plate number of the vehicle for usage of the toll road (step 638). Thereafter, the process terminates.

Returning again to step 634, if the computer determines that the similarity confidence score between the particular subgraph that contains the license plate node having the missing license plate information and the other subgraph that contains the given license plate node having the license plate number of the vehicle is not greater than the similarity confidence score threshold level based on the comparison, no output of step 634, then the computer determines that a different license plate number corresponds to the license plate node having the missing license plate information (step 640). Thereafter, the process terminates.

Thus, illustrative embodiments of the present disclosure provide a computer-implemented method, computer system, and computer program product for detecting vehicle license plate anomaly based on distance and time mutually exclusive node relationships and subgraph similarities using vehicle data fusion. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for vehicle license plate auditing, the computer-implemented method comprising:
   extracting, by a computer, distance and time traveling information corresponding to a vehicle from a data network analysis graph model of spatiotemporal traffic flow data based on a license plate number of the vehicle in response to removing irrelevant nodes from the data network analysis graph model;
   determining, by the computer, a distance and time mutually exclusive node relationship within the data network analysis graph model of spatiotemporal traffic flow data based on the distance and time traveling information corresponding to the vehicle extracted from the data network analysis graph model of spatiotemporal traffic flow data;
   determining, by the computer, an anomalous license plate node in the data network analysis graph model of spatiotemporal traffic flow data based on the distance and time mutually exclusive node relationship;
   performing, by the computer, a set of action steps regarding an anomalous license plate number corresponding to the anomalous license plate node;
   generating, by the computer, a plurality of subgraphs indicating relationships between license plate nodes within the data network analysis graph model of spatiotemporal traffic flow data in response to the computer determining that the data network analysis graph model includes a license plate node that has missing license plate information, each respective subgraph of the plurality of subgraphs contains a license plate node, a set of vehicle attribute nodes corresponding to the license plate node, and a road checkpoint node corresponding to the license plate node;
   determining, by the computer, using a similarity algorithm, an amount of similarity between each pair of subgraphs within the plurality of subgraphs based on fusion of information corresponding to nodes and edges contained in each particular pair of subgraphs;
   generating, by the computer, a similarity confidence score for each particular pair of subgraphs based on the amount of similarity between each pair of subgraphs;
   performing, by the computer, a comparison of the similarity confidence score of each particular pair of subgraphs to a defined similarity confidence score threshold level; and
   sending, by the computer, a notification to a traffic authority in response to determining that the similarity confidence score between a particular subgraph containing the license plate node having the missing license plate information and an other subgraph containing a given license plate node having the license plate number of the vehicle is greater than the similarity confidence score threshold level.

2. The computer-implemented method of claim 1, further comprising:
   determining, by the computer, whether the similarity confidence score between the particular subgraph that contains the license plate node having the missing license plate information and the other subgraph that contains the given license plate node having the license plate number of the vehicle is greater than the similarity confidence score threshold level based on the comparison;
   determining, by the computer, that the license plate number of the vehicle corresponds to the license plate node having the missing license plate information in response to the computer determining that the similarity confidence score between the particular subgraph that contains the license plate node having the missing license plate information and the other subgraph that contains the given license plate node having the license plate number of the vehicle is greater than the similarity confidence score threshold level based on the comparison; and
   sending, by the computer, the notification to the traffic authority regarding the license plate number of the vehicle corresponding to the missing license plate information to assess a fee to the license plate number of the vehicle for usage of a toll road.

3. The computer-implemented method of claim 2, further comprising:
   determining, by the computer, that a different license plate number corresponds to the license plate node having the missing license plate information in response to the computer determining that the similarity confidence score between the particular subgraph that contains the license plate node having the missing license plate information and the other subgraph that contains the given license plate node having the license plate number of the vehicle is not greater than the similarity confidence score threshold level based on the comparison.

4. The computer-implemented method of claim 1, further comprising:
capturing, by the computer, an image of the vehicle and its license plate using an imaging device at a road checkpoint located along a toll road traveled by the vehicle as the vehicle passes the road checkpoint, along with a timestamp of when the image was captured;
performing, by the computer, an analysis of the image of the vehicle and its license plate utilizing at least one of automatic license plate number recognition technology, computer vision, and an image convolutional neural network; and
determining, by the computer, the license plate number of the license plate on the vehicle and attributes of the vehicle based on the analysis of the image of the vehicle and its license plate.

5. The computer-implemented method of claim 4, further comprising:
obtaining, by the computer, geographic location information corresponding to the road checkpoint passed by the vehicle from a geospatial information system; and
generating, by the computer, vehicle travel data corresponding to the vehicle that includes the attributes of the vehicle as the vehicle passes respective road checkpoints located along the toll road traveled by the vehicle.

6. The computer-implemented method of claim 5, further comprising:
generating, by the computer, the data network analysis graph model containing the spatiotemporal traffic flow data by combining the vehicle traveling data with the geographic location information corresponding to the respective road checkpoints passed by the vehicle along the toll road;
determining, by the computer, whether the data network analysis graph model containing the spatiotemporal traffic flow data includes a license plate node that has missing license plate information; and
removing, by the computer, irrelevant license plate nodes corresponding to license plate numbers that do not match the license plate number of the vehicle, along with vehicle attributes nodes associated with the irrelevant license plate nodes corresponding to the license plate numbers that do not match the license plate number of the vehicle, from the data network analysis graph model in response to the computer determining that the data network analysis graph model does not include a license plate node that has missing license plate information.

7. A computer system for vehicle license plate auditing, the computer system comprising:
a communication fabric;
a storage device connected to the communication fabric, wherein the storage device stores program instructions; and
a processor connected to the communication fabric, wherein the processor executes the program instructions to:
extract distance and time traveling information corresponding to a vehicle from a data network analysis graph model of spatiotemporal traffic flow data based on a license plate number of the vehicle in response to removing irrelevant nodes from the data network analysis graph model;
determine a distance and time mutually exclusive node relationship within the data network analysis graph model of spatiotemporal traffic flow data based on the distance and time traveling information corresponding to the vehicle extracted from the data network analysis graph model of spatiotemporal traffic flow data;
determine an anomalous license plate node in the data network analysis graph model of spatiotemporal traffic flow data based on the distance and time mutually exclusive node relationship;
perform a set of action steps regarding an anomalous license plate number corresponding to the anomalous license plate node;
generate a plurality of subgraphs indicating relationships between license plate nodes within the data network analysis graph model of spatiotemporal traffic flow data in response to determining that the data network analysis graph model includes a license plate node that has missing license plate information, each respective subgraph of the plurality of subgraphs contains a license plate node, a set of vehicle attribute nodes corresponding to the license plate node, and a road checkpoint node corresponding to the license plate node;
determine, using a similarity algorithm, an amount of similarity between each pair of subgraphs within the plurality of subgraphs based on fusion of information corresponding to nodes and edges contained in each particular pair of subgraphs;
generate a similarity confidence score for each particular pair of subgraphs based on the amount of similarity between each pair of subgraphs;
perform a comparison of the similarity confidence score of each particular pair of subgraphs to a defined similarity confidence score threshold level; and
send a notification to a traffic authority in response to determining that the similarity confidence score between a particular subgraph containing the license plate node having the missing license plate information and an other subgraph containing a given license plate node having the license plate number of the vehicle is greater than the similarity confidence score threshold level.

8. The computer system of claim 7, wherein the processor further executes the program instructions to:
determine whether the similarity confidence score between the particular subgraph that contains the license plate node having the missing license plate information and the other subgraph that contains the given license plate node having the license plate number of the vehicle is greater than the similarity confidence score threshold level based on the comparison;
determine that the license plate number of the vehicle corresponds to the license plate node having the missing license plate information in response to determining that the similarity confidence score between the particular subgraph that contains the license plate node having the missing license plate information and the other subgraph that contains the given license plate node having the license plate number of the vehicle is greater than the similarity confidence score threshold level based on the comparison; and send the notification to the traffic authority regarding the license plate number of the vehicle corresponding to the missing license plate information to assess a fee to the license plate number of the vehicle for usage of a toll road.

9. The computer system of claim 8, wherein the processor further executes the program instructions to:
determine that a different license plate number corresponds to the license plate node having the missing license plate information in response to determining that the similarity confidence score between the particular subgraph that contains the license plate node having the missing license plate information and the other subgraph that contains the given license plate node having the license plate number of the vehicle is not greater than the similarity confidence score threshold level based on the comparison.

10. The computer system of claim 7, wherein the processor further executes the program instructions to:
capture an image of the vehicle and its license plate using an imaging device at a road checkpoint located along a toll road traveled by the vehicle as the vehicle passes the road checkpoint, along with a timestamp of when the image was captured;
perform an analysis of the image of the vehicle and its license plate utilizing at least one of automatic license plate number recognition technology, computer vision, and an image convolutional neural network; and
determine the license plate number of the license plate on the vehicle and attributes of the vehicle based on the analysis of the image of the vehicle and its license plate.

11. The computer system of claim 10, wherein the processor further executes the program instructions to:
obtain geographic location information corresponding to the road checkpoint passed by the vehicle from a geospatial information system; and
generate vehicle travel data corresponding to the vehicle that includes the attributes of the vehicle as the vehicle passes respective road checkpoints located along the toll road traveled by the vehicle.

12. A computer program product for vehicle license plate auditing, the computer program product comprising a computer-readable storage medium having program instructions embodied therewith, the program instructions executable by a computer to cause the computer to:
extract distance and time traveling information corresponding to a vehicle from a data network analysis graph model of spatiotemporal traffic flow data based on a license plate number of the vehicle in response to removing irrelevant nodes from the data network analysis graph model;
determine a distance and time mutually exclusive node relationship within the data network analysis graph model of spatiotemporal traffic flow data based on the distance and time traveling information corresponding to the vehicle extracted from the data network analysis graph model of spatiotemporal traffic flow data;
determine an anomalous license plate node in the data network analysis graph model of spatiotemporal traffic flow data based on the distance and time mutually exclusive node relationship;
perform a set of action steps regarding an anomalous license plate number corresponding to the anomalous license plate node;
generate a plurality of subgraphs indicating relationships between license plate nodes within the data network analysis graph model of spatiotemporal traffic flow data in response to determining that the data network analysis graph model includes a license plate node that has missing license plate information, each respective subgraph of the plurality of subgraphs contains a license plate node, a set of vehicle attribute nodes corresponding to the license plate node, and a road checkpoint node corresponding to the license plate node;
determine, using a similarity algorithm, an amount of similarity between each pair of subgraphs within the plurality of subgraphs based on fusion of information corresponding to nodes and edges contained in each particular pair of subgraphs;
generate a similarity confidence score for each particular pair of subgraphs based on the amount of similarity between each pair of subgraphs;
perform a comparison of the similarity confidence score of each particular pair of subgraphs to a defined similarity confidence score threshold level; and
send a notification to a traffic authority in response to determining that the similarity confidence score between a particular subgraph containing the license plate node having the missing license plate information and an other subgraph containing a given license plate node having the license plate number of the vehicle is greater than the similarity confidence score threshold level.

13. The computer program product of claim 12, wherein the program instructions further cause the computer to:
determine whether the similarity confidence score between the particular subgraph that contains the license plate node having the missing license plate information and the other subgraph that contains the given license plate node having the license plate number of the vehicle is greater than the similarity confidence score threshold level based on the comparison;
determine that the license plate number of the vehicle corresponds to the license plate node having the missing license plate information in response to determining that the similarity confidence score between the particular subgraph that contains the license plate node having the missing license plate information and the other subgraph that contains the given license plate node having the license plate number of the vehicle is greater than the similarity confidence score threshold level based on the comparison; and
send the notification to the traffic authority regarding the license plate number of the vehicle corresponding to the missing license plate information to assess a fee to the license plate number of the vehicle for usage of a toll road.

14. The computer program product of claim 13, wherein the program instructions further cause the computer to:
determine that a different license plate number corresponds to the license plate node having the missing license plate information in response to determining that the similarity confidence score between the particular subgraph that contains the license plate node having the missing license plate information and the other subgraph that contains the given license plate node having the license plate number of the vehicle is not greater than the similarity confidence score threshold level based on the comparison.

15. The computer program product of claim 12, wherein the program instructions further cause the computer to:
capture an image of the vehicle and its license plate using an imaging device at a road checkpoint located along a toll road traveled by the vehicle as the vehicle passes the road checkpoint, along with a timestamp of when the image was captured;

perform an analysis of the image of the vehicle and its license plate utilizing at least one of automatic license plate number recognition technology, computer vision, and an image convolutional neural network; and determine the license plate number of the license plate on the vehicle and attributes of the vehicle based on the analysis of the image of the vehicle and its license plate.

16. The computer program product of claim 15, wherein the program instructions further cause the computer to:

obtain geographic location information corresponding to the road checkpoint passed by the vehicle from a geospatial information system; and generate vehicle travel data corresponding to the vehicle that includes the attributes of the vehicle as the vehicle passes respective road checkpoints located along the toll road traveled by the vehicle.

17. The computer program product of claim 16, wherein the program instructions further cause the computer to:

generate the data network analysis graph model containing the spatiotemporal traffic flow data by combining the vehicle traveling data with the geographic location information corresponding to the respective road checkpoints passed by the vehicle along the toll road;

determine whether the data network analysis graph model containing the spatiotemporal traffic flow data includes a license plate node that has missing license plate information; and remove irrelevant license plate nodes corresponding to license plate numbers that do not match the license plate number of the vehicle, along with vehicle attributes nodes associated with the irrelevant license plate nodes corresponding to the license plate numbers that do not match the license plate number of the vehicle, from the data network analysis graph model in response to determining that the data network analysis graph model does not include a license plate node that has missing license plate information.

* * * * *